United States Patent
Hansson

(10) Patent No.: US 11,107,236 B2
(45) Date of Patent: Aug. 31, 2021

(54) PROJECTED AUGMENTED REALITY INTERFACE WITH POSE TRACKING FOR DIRECTING MANUAL PROCESSES

(71) Applicant: Dag Michael Peter Hansson, Silang (PH)

(72) Inventor: Dag Michael Peter Hansson, Silang (PH)

( * ) Notice: Subject to any disclaimer, the term of this patent is extended or adjusted under 35 U.S.C. 154(b) by 72 days.

(21) Appl. No.: 16/391,107

(22) Filed: Apr. 22, 2019

(65) Prior Publication Data

US 2020/0334851 A1  Oct. 22, 2020

(51) Int. Cl.

| | | |
|---|---|---|
| *G06T 7/55* | (2017.01) | |
| *G03B 21/132* | (2006.01) | |
| *G06T 7/73* | (2017.01) | |
| *G03B 21/14* | (2006.01) | |
| *G06F 3/01* | (2006.01) | |
| *G06T 7/00* | (2017.01) | |

(52) U.S. Cl.
CPC .............. *G06T 7/73* (2017.01); *G03B 21/132* (2013.01); *G03B 21/145* (2013.01); *G06F 3/013* (2013.01); *G06F 3/017* (2013.01); *G06T 7/0004* (2013.01); *G06T 7/55* (2017.01)

(58) Field of Classification Search
CPC ........... G06T 7/73; G06T 7/55; G06T 7/0004; G06T 2207/30108; G06T 2207/30196; G06T 2207/10016; G06T 2207/10028; G06T 2200/04; G06T 7/70; G03B 21/132; G03B 21/145; G06F 3/017
See application file for complete search history.

(56) References Cited

U.S. PATENT DOCUMENTS

| | | | |
|---|---|---|---|
| 2,682,117 A | 6/1954 | Wales | |
| 3,600,785 A | 8/1971 | Cook | |
| 3,623,066 A | 11/1971 | Norris | |
| 3,667,104 A | 6/1972 | Chamillard et al. | |

(Continued)

FOREIGN PATENT DOCUMENTS

| | | |
|---|---|---|
| CN | 103207671 A | 7/2013 |
| CN | 106372421 A | 2/2017 |

(Continued)

OTHER PUBLICATIONS

Aligned Vision, product brochure form Aligned Vision, 2017, 6 pages.

(Continued)

*Primary Examiner* — Siamak Harandi
(74) *Attorney, Agent, or Firm* — The Juhasz Law Firm

(57) ABSTRACT

Technologies are described for providing a projected augmented reality system with pose tracking for directing manual processes. A projected augmented reality system includes a video projector, configured to project a dynamically-changing image onto a surface within a work area of an operator, a sensor, and a computer. The computer includes a memory including instructions that when executed cause the computer to obtain three-dimensional pose data using the sensor, determine an output graphical element based on a sequence of three-dimensional pose data over time, and on a current production state, and send an output image based on the output graphical element to the video projector for projection onto the surface.

40 Claims, 10 Drawing Sheets

(56) References Cited

U.S. PATENT DOCUMENTS

| | | |
|---|---|---|
| 3,986,244 A | 10/1976 | Latanzi |
| 4,102,568 A | 7/1978 | Miyagi |
| 4,163,309 A | 8/1979 | Stuckler |
| 4,222,036 A | 9/1980 | Troukens |
| 4,318,222 A | 3/1982 | Frohlich |
| 4,469,553 A | 9/1984 | Whitehead |
| 4,890,382 A | 1/1990 | Anderson et al. |
| 5,119,536 A | 6/1992 | Leitz et al. |
| 5,341,183 A | 8/1994 | Dorsey-Palmteer |
| 5,406,176 A | 4/1995 | Sugden |
| 5,430,662 A | 7/1995 | Ahonen |
| 5,506,641 A | 4/1996 | Dorsey-Palmateer |
| 5,661,667 A | 8/1997 | Rueb et al. |
| 5,801,946 A | 9/1998 | Nissen et al. |
| 5,910,894 A | 6/1999 | Pryor |
| 6,000,801 A | 12/1999 | Dillon et al. |
| 6,023,278 A | 2/2000 | Margolin |
| 6,036,319 A | 3/2000 | Rueb et al. |
| 6,170,163 B1 | 1/2001 | Bordignon et al. |
| 6,224,385 B1 | 5/2001 | Nitta et al. |
| 6,229,546 B1 | 5/2001 | Lancaster et al. |
| 6,317,980 B2 | 11/2001 | Buck, III |
| 6,600,476 B2 | 7/2003 | Mathis et al. |
| 6,658,218 B2 | 12/2003 | Krolczyk et al. |
| 7,027,886 B2 | 4/2006 | Hoppes et al. |
| 7,090,134 B2 | 8/2006 | Ramsager |
| 7,103,499 B2 | 9/2006 | Goodwin et al. |
| 7,181,362 B2 | 2/2007 | Ratti et al. |
| 7,193,696 B2 | 3/2007 | Engelbart et al. |
| 7,268,893 B2 | 9/2007 | Palmateer |
| 7,433,796 B2 | 10/2008 | Behan et al. |
| 7,463,368 B2 | 12/2008 | Morden et al. |
| 7,515,981 B2 | 4/2009 | Ryznar et al. |
| 8,064,684 B2 | 11/2011 | Ratti et al. |
| RE43,462 E | 6/2012 | Washino et al. |
| 8,749,396 B2 | 6/2014 | Maggiore |
| 9,262,016 B2 | 2/2016 | McGibney et al. |
| 9,262,068 B2 | 2/2016 | Tyler et al. |
| 9,338,936 B2 | 5/2016 | Loefkrantz et al. |
| 9,423,879 B2 | 8/2016 | Chen |
| 9,658,614 B2 | 5/2017 | Ryznar et al. |
| 10,052,147 B2 | 8/2018 | Merschon et al. |
| 10,139,916 B2 | 11/2018 | Poupyrev |
| 10,282,600 B2 | 5/2019 | Curlander et al. |
| 2003/0007354 A1 | 1/2003 | Schubert et al. |
| 2003/0073541 A1 | 4/2003 | Carlson |
| 2004/0111901 A1 | 6/2004 | Newcomer |
| 2004/0182925 A1 | 9/2004 | Anderson et al. |
| 2004/0195320 A1 | 10/2004 | Ramsager |
| 2004/0207652 A1 | 10/2004 | Ratti et al. |
| 2005/0013477 A1 | 1/2005 | Ratti et al. |
| 2005/0059699 A1 | 3/2005 | Funamizu et al. |
| 2005/0154431 A1 | 7/2005 | Quistgaard et al. |
| 2005/0273254 A1 | 12/2005 | Malchi et al. |
| 2006/0059699 A1 | 3/2006 | Krantz et al. |
| 2006/0106483 A1 | 5/2006 | Behan et al. |
| 2006/0185181 A1 | 8/2006 | Long et al. |
| 2007/0180674 A1 | 8/2007 | Morden et al. |
| 2008/0121168 A1 | 5/2008 | Ryznar et al. |
| 2011/0178627 A1 | 7/2011 | Wechter et al. |
| 2012/0062725 A1 | 3/2012 | Wampler et al. |
| 2013/0176220 A1 | 7/2013 | Merschon et al. |
| 2013/0325155 A1 | 12/2013 | Ryznar et al. |
| 2016/0026253 A1* | 1/2016 | Bradski .............. H04N 13/344 345/8 |
| 2016/0358382 A1 | 12/2016 | Lee et al. |
| 2017/0228940 A1* | 8/2017 | Kutliroff .................. G06T 7/12 |
| 2017/0255186 A1 | 9/2017 | Ryznar et al. |
| 2020/0273177 A1* | 8/2020 | Chen ...................... G06T 19/20 |

FOREIGN PATENT DOCUMENTS

| | | |
|---|---|---|
| CN | 107423650 A | 12/2017 |
| CN | 103594199 B | 8/2018 |
| CN | 109003301 A | 12/2018 |
| DE | 10320557 A1 | 12/2004 |
| DE | 102015112722 A1 | 2/2017 |
| DE | 102016202581 A1 | 8/2017 |
| EP | 2575147 A2 | 4/2013 |
| JP | 2006-206484 A | 7/2004 |
| JP | 2009-279193 A | 12/2009 |
| JP | 2010-250415 A | 11/2010 |
| KR | 101821418 B1 | 4/2012 |
| WO | 044558 A2 | 4/2007 |
| WO | 109593 A1 | 8/2012 |
| WO | 2012123033 A1 | 9/2012 |

OTHER PUBLICATIONS

The Actuated Workbench: Computer-Controlled Actuation in Tabletop Tangible Interfaces, Pangaro et al., UIST 2002, 10 pages.

The Design of Active Workspaces, Wendy Guang-wen Ju, Master's Thesis, Stanford Univ., 1997, 93 pages.

Illuminating Clay: A 3-D tangible interface for landscape analysis, Piper et al., Proceedings of Conference on Human Factors in Computing Systems (CHI 2002), Apr. 20-25, 2002, 7 pages.

The Illuminated Design Environment: A 3-D tangible interface for landscape analysis, Benjamin Fielding-Piper, Master's Thesis, Massachusetts Institute of Technology, 2002, 123 pages.

Pins: A Haptic Computer Interface System, Bradley Kaanta, Master's Thesis, Massachusetts Institute of Technology, Jun. 2004, 95 pages.

Augmented Reality for Industrial Building Acceptance, Ralph Schoenfelder et al., Graz University of Technology, publ in IEEE Virtual Reality Conf., 2008, 9 pages.

Tangible Interfaces for Manipulating Aggregates of Digital Information, Brygg Ullmer, Doctoral Dissertation, Massachusetts Institute of Technology, Sep. 2002, 268 pages.

Using Picture Prompts to Teach an Adult with Developmental Disabilities to Independently Complete Vocational Tasks (excerpt only), Stephanie Steed et al., J. Developmental and Physical Disabilities, vol 2, #2, 1997, pp. 117-118.

Augmented Reality for Construction Tasks: Doorlock Assembly, Reiners et al., 1st Int'l Workshop on Augmented Reality (IWAR '98), Nov. 1998, 10 pages.

Cognitive, Performance, and Systems Issues for Augmented Reality Applications in Manufacturing and Maintenance, Neumann and Majoros, publ in Proceedings, IEEE 1998 Virtual Reality Annual Int'l Symposium, Mar. 14-18, 1998, 8 pages.

Spatially Augmented Reality, Rasker et al., First Int'l Workshop on Augmented Reality, Nov. 1998, 7 pages.

The I/O Bulb and the Luminous Room, John Underkoffler, Doctoral Dissertation, Massachusetts Institute of Technology, Feb. 1999, 88 pages.

The Everywhere Displays Projector: A Device to Create Ubiquitous Graphical Interfaces, Claudio Pinhanez, 2001, 18 pages.

Arkiva Augmented Reality for Development, Production, and Service, Wolfgang Friedrich, 2002, 13 pages.

Computer Vision-Based Augmented Reality for Guiding Manual Assembly, Sharma et al., publ in Presence, vol. 6, No. 3, Jun. 1997, pp. 292-317, 26 pages.

Augmented Urban Planning Workbench: Overlaying Drawings, Physical Models and Digital Simulation, Ishii et al., Proc. of IEEE & ISMAR 2002, Oct. 2002, 9 pages.

Comparative Effectiveness of Augmented Reality in Object Assembly, Tang et al., Proceedings of Conference on Human Factors in Computing Systems (CHI 2003), Apr. 5-10, 2003, 9 pages.

Designing Effective Step-by-Step Assembly Instructions, Agrawala et al., 2003, 10 pages.

Searchlight—A lightweight search function for pervasive environments (excerpt only), Butz et al., excerpt from Pervasive 2004, LNCS 3001, pp. 351-352, 2 pages.

Tangible User Interfaces (TUIs): a novel paradigm for GIS, Ratti et al., Transactions in GIS, vol. 8, issue 4, Oct. 2004, 17 pages.

Dynamic Selection of Web Services with Recommendation System, Manikrao et al, 2005, 5 pages.

(56) References Cited

OTHER PUBLICATIONS

CADcast: a Method for Projecting Spatially Referenced Procedural Instructions, Piper et al., 2001, 3 pages.
A Design for Assembly application with dynamic information retrieval from case database, Iwaya et al., publ in 11th IFAC Workshop on Intelligent Manufacturing Systems, May 22-23, 2013, pp. 186-191 (6 pages).
Comparing Projected in Situ Feedback at the Manual Assembly Workplace with Impaired Workers, Funk et al., publ. in PETRA '15, Jul. 1-3, 2015, 8 pages.
An Overview of Dynamic Software Product Line architectures and techniques: Observations from research and industry, Capilla et al., J. Syst. Software, 2014, 21 pages.
Assistive Systems for the Workplace: towards context-aware assistance, Korn et al., 2015, 15 pages.
Using In-Situ Projection to Support Cognitively Impaired Workers at the Workplace, Funk et al., publ in ASSETS '15, Oct. 26-28, 2015, 8 pages.
Interactive Worker Assistance: Comparing the Effects of In-Situ Projection, Head-Mounted Displays, Tablet, and Paper Instructions, Funk et al., publ. in Ubicomp 2016, Sep. 12-16, 2016, 7 pages.
Use of projector based augmented reality to improve manual spot-welding precision and accuracy for automotive manufacturing, Doshi et al., Int. J. Adv. Manuf. Technol. (2017) 89:1279-1293, publ. on-line Jul. 25, 2016, 15 pages.
The Design Space of Augmented and Virtual Reality Applications for Assistive Environments in Manufacturing: A Visual Approach, Buttner et al., publ. in PETRA '17, Jun. 21-23, 2017, 8 pages.
Models and Mechanisms for Tangible User Interfaces, Brygg Ullmer, Master's Thesis, Massachusetts Institute of Technology,1997, 82 pages.
Applications of Computer-Controlled Actuation in Wiorkbench Tangible User Interfaces, Daniel Maynes-Aminzade, Master's Thesis, Massachusetts Institute of Technology,2003, 63 pages.
Tactile Spatial Interfaces for Computer-Aided Design Superimposing Physical Media and Computation, Dorothy Shamonsky, Doctoral Dissertation, Massachusetts Institute of Technology,2003, 163 pages.
Dynamic Spatially Augmented 3D Painting, Bandyopadhyay et al., 2001, 6 pages.
The Actuated Workbench: 2D Actuation in Tabletop Tangible Interfaces, Gian Pangaro, Master's Thesis, Massachusetts Institute of Technology, 2003, 105 pages.
CS-400E Semiautomatic Through-Hole Assembly Machine (brochure), Versatec Solutions, 1993, 12 pages.
Tangible Bits: Towards Seamless Interfaces between People, Bits and Atoms, Ishii et al., Proceedings of Conference on Human Factors in Computing Systems (CHI 1997), Mar. 22-27, 1997, pp. 234-241, 8 pages.
Projection-based Augmented Reality in Engineering Applications, Stork et al., PBAR in Engineering Applications, Jan. 2002, 8 pages.
9th Int'l Conference on Human-Computer Interaction (conference Brochure), Aug. 5-10, 2001, 48 pages.
PegBlocks: a learning aid for the Elementary Classroom, Piper et al., publ. Extended Abstracts of Proceedings of Conference on Human Factors in Computing Systems, CHI 2002, Apr. 20-25, 2002, 3 pages.
Industrial Augmented Reality Applications, case studies of Augmented Reality Applications, Holger Regenbrecht, 2007, publ in Emerging Technologies of Augmented Reality: Interfaces and Design (book), pp. 283-304. 21 pages.
Virtual and Augmented Reality Technologies for Product Realization, Lu et al., 1999, 25 pages.
Assembly Guidance in Augmented Reality Environments Using a Virtual Interactive Tool, Yuan et al., 2005, 9 pages.
Deep Learning Models and Code for Pose Estimation, non-attributed, Jun. 23, 2018, 10 pages.
OpenPose: Realtime Multi-Person 2D Pose Estimation using Part Affinity Fields, Cao et al., IEEE Trans. on Pattern Analysis and Machine Intelligence, Dec. 2018, 14 pages.
Realtime Multi-Person 2D Pose Estimation using Part Affinity Fields, Cao et al., Apr. 2017, 9 pages.
The Digital Desk Calculator: Tangible Manipulation on a Desk Top Display, Pierre Wellner, UIST '91, Nov. 11-13, 1991, 7 pages.
Product Design for Manufacture and Assembly (book), Boothroyd et al. (editors), 2011, part 1, 350 pages.
Product Design for Manufacture and Assembly (book), Boothroyd et al. (editors), 2011, part 2, 360 pages.
Written Opinion and Int'l Search Report, PCT/IB2020/053712, dated Jul. 9, 2020 (16 pages).
Marco Carrao et al., "Real-time marker-less multi-person 3D pose estimation in RGB-depth camera networks," ARXIV.org, Cornell Univ. Library, 201 Olin Library, Cornell Univ., Ithaca, NY 14853, Oct. 17, 2017, XP080824964 (6 pages).
Emily-Jane Rolley-Parnell et al., "Bi-Manual Articulated Robot Teleoperation using an External RGB-D Range Sensor," 2018 15th Int'l Conf. on Control, Automation, Robotics and Vision (ICARCV), IEEE, Nov. 18, 2018, XP033480738 (7 pages).
Product Design for Manufacture and Assembly (book), Ioan Marinescu, editor, 2002, part 1, 220 pages.
Product Design for Manufacture and Assembly (book), Ioan Marinescu, editor, 2002, part 2, 250 pages.
Product Design for Manufacture and Assembly (book), Ioan Marinescu, editor, 2002, part 3, 218 pages.

\* cited by examiner

PROJECTED AUGMENTED REALITY INTERFACE WITH POSE TRACKING FOR DIRECTING MANUAL PROCESSES

BACKGROUND

Field of the Invention

The present invention relates to projected augmented reality systems for improving the efficiency and compliance of manual labor. More specifically, it provides systems for interacting with a human worker through a dynamic interface projected into a work area.

Description of the Related Art

Use of manual labor in factories and in other assembly or production environments has many challenging aspects. For example, for some assembly tasks, extensive training may be necessary to achieve acceptable efficiency or quality, but investment in this training is frequently lost in high-turnover production settings, such as factories or fast-food restaurants. Additionally, in many instances, operators and the products that they produce need to be closely monitored for compliance to regulations and standards. Further, if the work of one operator is too slow, or his/her quality is not sufficient, there may be problems with both the efficiency and quality of downstream operations that rely on the output of that operator.

Generally, a factory or other assembly or production facility can either simply accept current output, or automate various process steps, which may require a large initial investment, and may be far less flexible when products or processes change.

Other solutions, such as light-guided systems that provide automated visual indicators to an operator in a production setting to guide sequential actions have been proposed, and have had limited success in improving processes and reducing error rates. However, such systems have generally employed sensors such as switches, light curtains or barcode readers. Use of such sensors may limit the applications of such systems to simple "on/off" detection of triggering events, such as the presence of a hand at a specific location. Even when such systems have employed more advanced vision systems, they have been configured to detect only particular characteristics or identification information. This makes such systems inflexible, since the particular set of sensors or detected information requires extensive customization for each product and/or workstation.

Use of conventional augmented reality systems, employing handheld devices, such as tablets or phones, or wearables, such as glasses or helmets, are not practical in a high-volume production setting such as a factory for reasons of cost, comfort, ergonomics, weight and long-term user acceptance.

SUMMARY

Technologies are described for providing a projected augmented reality system with pose tracking for directing manual processes. In one aspect, an augmented reality system for directing an operator to perform a manual process includes a video projector, configured to project a dynamically-changing image onto a surface within a work area of the operator; an image sensor configured to capture two-dimensional images of the operator and of the work area; a depth sensor configured to capture three-dimensional images of the operator and of the work area; and a computer communicatively connected to the video projector, the image sensor, and the depth sensor. The computer includes a memory and a processor, the memory including instructions that when executed by the processor cause the computer to: receive a two-dimensional image of the operator and of at least a portion of the work area from the image sensor; determine pose data for the operator from the two-dimensional image; receive a three-dimensional image of the operator and of the work area from the depth sensor; update the pose data with depth coordinates based on the three-dimensional image to provide three-dimensional pose data; determine an output graphical element based on a sequence of three-dimensional pose data over time, and on a current production state; and send an output image based on the output graphical element to the video projector for projection onto the surface.

In another aspect a method for using an augmented reality system for directing an operator to perform a manual process includes: receiving by a computer a two-dimensional image of the operator and of at least a portion of a work area from an image sensor; determining by the computer pose data for the operator from the two-dimensional image; receiving by the computer a three-dimensional image of the operator and of the work area from a depth sensor; updating by the computer the pose data with depth coordinates based on the three-dimensional image to provide three-dimensional pose data; determining by the computer an output graphical element based on a sequence of three-dimensional pose data over time, and on a current production state; and projecting an output image based on the output graphical element onto a surface within the work area using a video projector.

In a further aspect, a projected augmented reality system for directing an operator to perform a manual process includes: a video projector, configured to project a dynamically-changing image onto a surface within a work area of the operator; a sensor; and a computer communicatively connected to the video projector and the sensor, the computer comprising a memory and a processor. The memory includes instructions that when executed by the processor cause the computer to: obtain three-dimensional pose data using the sensor; determine an output graphical element based on a sequence of three-dimensional pose data over time, and on a current production state; and send an output image based on the output graphical element to the video projector for projection onto the surface.

DETAILED DESCRIPTION

Figure 1:
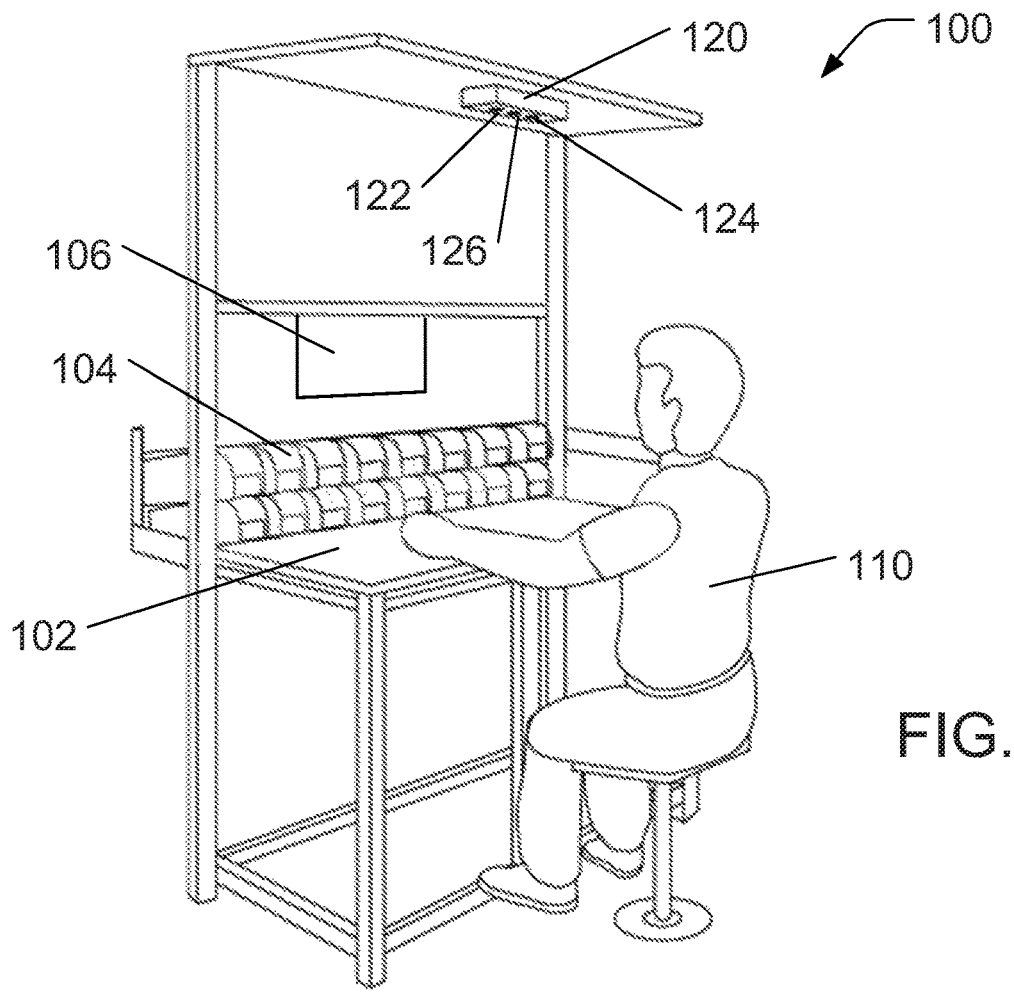
FIG. 1 shows an example of a work area for assembling or manufacturing a product, in accordance with a disclosed embodiment.

In the following detailed description, reference is made to the accompanying drawings that form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Disclosed herein is a projected augmented reality system with pose tracking for directing manual processes. In one aspect, an augmented reality system for directing an operator to perform a manual process includes a video projector, configured to project a dynamically-changing image onto a surface within a work area of the operator; an image sensor configured to capture two-dimensional images of the operator and of the work area; a depth sensor configured to capture three-dimensional images of the operator and of the work area; and a computer communicatively connected to the video projector, the image sensor, and the depth sensor. The computer includes a memory and a processor, the memory including instructions that when executed by the processor cause the computer to: receive a two-dimensional image of the operator and of at least a portion of the work area from the image sensor; determine pose data for the operator from the two-dimensional image; receive a three-dimensional image of the operator and of the work area from the depth sensor; update the pose data with depth coordinates based on the three-dimensional image to provide three-dimensional pose data; determine an output graphical element based on a sequence of three-dimensional pose data over time, and on a current production state; and send an output image based on the output graphical element to the video projector for projection onto the surface.

In another aspect a method for using an augmented reality system for directing an operator to perform a manual process includes: receiving by a computer a two-dimensional image of the operator and of at least a portion of a work area from an image sensor; determining by the computer pose data for the operator from the two-dimensional image; receiving by the computer a three-dimensional image of the operator and of the work area from a depth sensor; updating by the computer the pose data with depth coordinates based on the three-dimensional image to provide three-dimensional pose data; determining by the computer an output graphical element based on a sequence of three-dimensional pose data over time, and on a current production state; and projecting an output image based on the output graphical element onto a surface within the work area using a video projector.

In a further aspect, a projected augmented reality system for directing an operator to perform a manual process includes: a video projector, configured to project a dynamically-changing image onto a surface within a work area of the operator; a sensor; and a computer communicatively connected to the video projector and the sensor, the computer comprising a memory and a processor. The memory includes instructions that when executed by the processor cause the computer to: obtain three-dimensional pose data using the sensor; determine an output graphical element based on a sequence of three-dimensional pose data over time, and on a current production state; and send an output image based on the output graphical element to the video projector for projection onto the surface.

As will be discussed below, a projected augmented reality system according to the disclosure may enable a human operator to execute a sequence of process steps in a more accurate, reliable manner, and with increased throughput. This may help a factory or other establishment to meet their productivity and yield goals without automating and, for example, replacing human operators with robots.

Additionally, by using pose tracking, less costly hardware may be used to implement the system, and complexity may be moved from hardware to software, increasing the flexibility of the system. Further, use of pose tracking may provide a more fluid interface and natural operator interaction, which improves throughput and reliability. Allowing operators to execute processes with normal, fluid arm and hand movements, may also decrease stress and training requirements, while also allowing operators to work faster. The pose tracking system of the disclosure also provides for differentiating between the operator and other humans operating within the area, which may improve reliability.

Embodiments in this disclosure will generally be described in terms of use in manufacturing and assembly, for instance in the electronics industry. It will be understood that there may be many other environments in which the systems and methods of the disclosure may be used. For example, similar systems could be used in food service businesses, such as fast-food restaurants, or in other industries that employ low-skill workers with high worker turnover and/or little training, and that nonetheless need to efficiently produce a consistent product. Systems according to the disclosure may also be used in other industries, such as in banking (e.g., in operations such as cash processing centers) or in casinos, where worker monitoring and control for security, and for policy and legal compliance are needed. The system could also be used, for example, in medical applications, to provide real-time information to surgeons or other medical personnel. In general, the systems of the disclosure may be advantageously deployed for a wide range of uses in improving efficiency and compliance of workers, and in monitoring for security and prevention of fraud.

FIG. 1 shows an example of a work area for assembling or manufacturing a product, in accordance with an embodiment. The work area 100 includes a work surface 102, which is used for assembling a product. Numerous parts containers 104 and assembly tools (not shown) may be arranged near the work surface 102. The work area 100 may also include instruction 106 or other printed material to which an operator 110 may refer. In accordance with various embodiments, the work area 100 may also include a projected augmented reality device 120, which projects a dynamic interface onto the work surface 102, and that tracks poses of the operator 110 to interact with the operator 110 during assembly or manufacturing of a product.

The projected augmented reality device 120 generally includes at least one image sensor or camera 122, at least one three-dimensional image sensor 124, such as a depth sensor, and at least one video projector 126. Additionally, a computer (not shown) is connected to the camera 122, the three-dimensional image sensor 124, and the video projector 126, in order to process input from the camera 122, and three-dimensional image sensor 124 to determine a pose and movement of the operator 110, and based on the pose and movement of the operator 110, and the current state of the process, to determine dynamic interface images to be projected onto the work surface 102 by the video projector 126.

Figure 2:
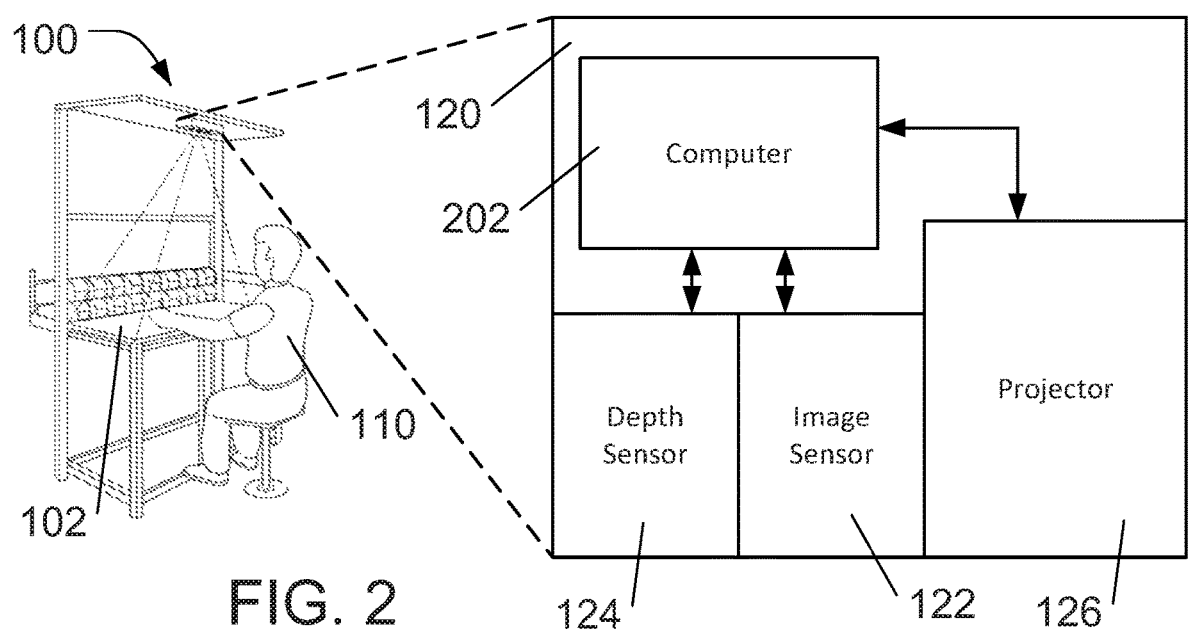
FIG. 2 shows a more detailed view of the projected augmented reality device of FIG. 1.

FIG. 2 shows a more detailed view of the projected augmented reality device 120, including the image sensor or camera 122, the three-dimensional image sensor 124 (such as a depth sensor), the video projector 126, and a computer 202 connected to the camera 122, three-dimensional image sensor 124, and video projector 126.

The camera 122 includes one or more two-dimensional image sensors or cameras, which may optionally have varying fields of view for viewing the movements of the operator 110. For example, the camera 122 may include a digital two-dimensional video camera that has a wide field of view, so that images of the entire work area 100 are captured. Such digital two-dimensional video cameras are inexpensive, and well-known.

The digital two-dimensional video camera could, for example, be an inexpensive "webcam" such as a webcam manufactured by Logitech International, of Lausanne, Switzerland.

In addition to a two-dimensional camera with a wide field of view, the camera 122 may include one or more two-dimensional video cameras (not shown) equipped with lenses (not shown) that allow them to focus narrowly on one or more locations in the work area 100. Such a narrow-field two-dimensional camera may, for example, be configured as an "automated optical inspection" (AOI) camera, which may be used to focus on a circuit board (not shown) that is being assembled in the work area 100, to inspect the board for quality of assembly. Such a narrow-field two-dimensional camera could also be used, for example, to closely monitor the hands of the operator 110, to ensure that the correct parts are being accessed or used.

The three-dimensional image sensor 124 includes one or more three-dimensional image sensors, such as depth sensors. At least one three-dimensional image sensor 124 should have a wide field of view, so that depth information on the entire work area 100 can be captured. The three-dimensional image sensor 124 may be a commercially available depth sensor, such as a REALSENSE depth camera, manufactured by Intel Corporation, of Santa Clara, Calif.

The video projector 126 may be one or more projectors, configured to project bright, high-resolution, high frame-rate moving color images onto portions of the work area 100. In some embodiments, the video projector 126 may be configured to project onto a particular portion, such as the work surface 102, of the work area 100. In some embodiments, the video projector 126 may be configured to project images over multiple portions of the work area 100, or over the entirety of the work area 100, and may employ one or more video projectors to achieve this.

To avoid the need for special lighting conditions in the work area 100, the video projector 126 may be a high-brightness projector, such as a laser or laser/LED hybrid projector. For example, a laser/LED hybrid projector manufactured by Casio Computer Co., Ltd., of Tokyo, Japan could be used.

The computer 202 is connected to the camera 122, the three-dimensional image sensor 124, and the video projector 126. The computer 202 is configured to use input streams from the camera 122 and from the three-dimensional image sensor 124 to determine the pose and movement of the operator 110, and to project dynamic moving images into the work area 100 using the video projector 126. Additionally, the computer 202 may be configured to perform other tasks, such as monitoring AOI input from the camera 122 to monitor, e.g., for compliance with quality standards. Additionally, the computer 202 may be configured to monitor the operator 110 for security or fraud-prevention purposes, and/or to monitor the operator's hand gestures, to provide commands to the computer 202. The computer 202 may also accept inputs from other sensors (not shown), such as an eye tracking sensor, a microphone, and/or a barcode scanner.

In some embodiments, the computer 202 may be connected to a network (not shown), and may be configured to accept updates and process information over the network, and to store information on a server connected to the network. In some embodiments, the computer may be configured to use a game engine and a three-dimensional model of the work area 100 and the video projector 126 to scale and align images for projection onto portions of the work area 100.

In some embodiments, the computer 202 may be located in a separate housing, located either within or near the work area 100. In some embodiments, the computer 202 may be located within a common housing with the camera 122, the three-dimensional image sensor 124, and the video projector 126. The computer 202 may, for example, be a miniaturized PC, such as the Zotac ZBOX Mini-PC with onboard GPU, manufactured by Zotac of Hong Kong.

Figure 3:
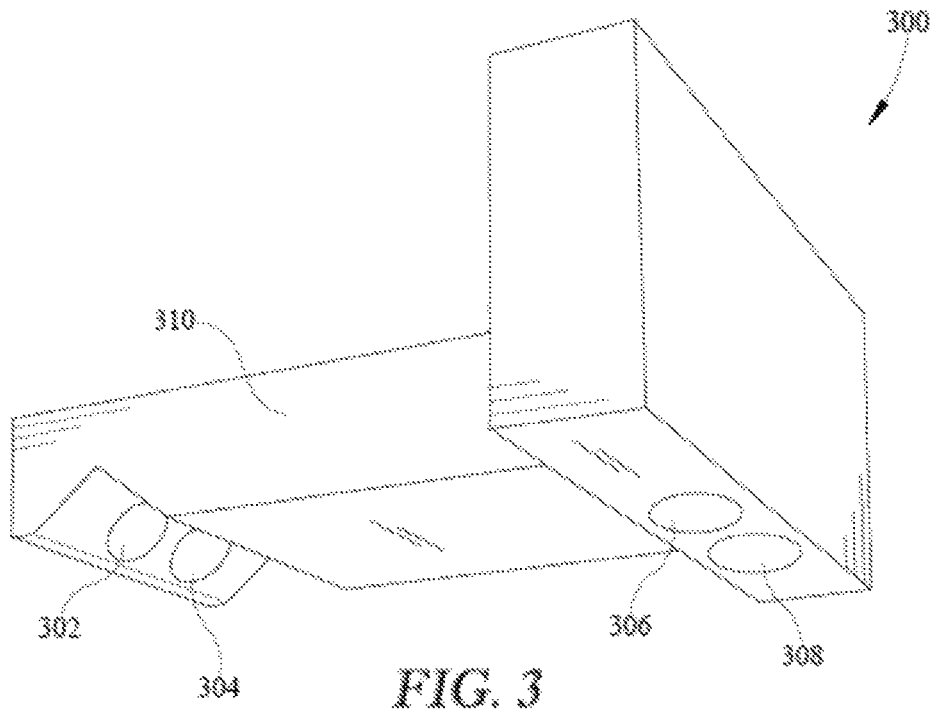
FIG. 3 shows an embodiment in which the components of the system are combined into a single housing.

FIG. 3 shows an embodiment in which the components of the system are combined into a single housing. The housing 300 contains a two-dimensional image sensor or camera 302, a three-dimensional image sensor 304, a video projector 306, an optional AOI camera 308, and a computer 310. By providing substantially the entire system within a single, compact housing, the projected augmented reality system of the disclosure can easily be packaged and sold as a "standard" product, that can be used with a wide variety of work areas, rather than as a "custom" product that requires the extra time and expense of extensive customization for each work area or type of work area.

In accordance with some embodiments, certain components may remain external from the housing 300, or alternatively could (when practical) be integrated into a housing similar to the housing 300. Components that are external from the housing 300 may be connected to the system (e.g., connected to the computer 310) using either a wired or a wireless connection.

These external components may include an optional barcode scanner (not shown), which may be used to issue commands to the system either instead of or in addition to using gesture recognition to issue commands to the system. It may be useful to have a barcode scanner located outside of the housing 300, so that the operator can issue commands using barcodes printed on a sheet using, e.g., a handheld barcode scanner.

An optional eye tracking device (not shown), such as a Tobii Eye Tracker 4C, manufactured by Tobii AB, of Danderyd, Sweden, could also remain external from the housing 300. Such an eye tracking system may be used, for example, to select an option in the projected augmented reality user interface by looking at it for a predetermined period of time. Eye tracking could also be used to determine, through software running on the computer, if a quality inspector has properly inspected an entire assembly by scanning it with his/her eyes. Eye tracking could further be used in accordance with some embodiments for estimating an operator's "engagement index" by measuring how closely the operator is looking at his/her work during operations, and how often he/she looks away from it. It may be useful to have an eye tracking device located outside of the housing 300, so that the eye tracking device can be given a good view of the operator's eyes.

An optional microphone (not shown) could also be used outside of the housing 300. For example, a microphone could be used in connection with embodiments of the system for issuing voice commands to the system, for entering voice notes or annotations from the operator, or for talking to a supervisor or dispatcher to, e.g., request information, help, or material refills. It may be useful to have a microphone located outside of the housing 300 so that the operator's voice can be more clearly picked up by the microphone in noisy environments. For such uses, a microphone could, e.g., be located on a headset or earpiece worn by the operator. An optional speaker (not shown) could also be used outside of the housing 300, to provide audible feedback to the user, indicating that an error has occurred, and that corrective action is needed.

Optional haptic feedback devices (not shown) could also be used outside of the housing 300, to provide a more immersive interface for the user, by bonding a piezo element, buzzer, vibration motor, or similar device to the work surface on which the operator's arms and/or hands rest.

By combining components of the system into a single housing to provide a "standard" projected augmented reality system, the hardware may be easily installed, without requiring extensive custom modification or fitting. For example, the system could be installed by mounting the housing 300 mechanically (using, e.g., clamps and/or bolts) in a position above a work area, such as at the top of a workstation. The system may then be connected to a power source, and any external devices may be connected. The system may require some minor configuration, which could, for example, be achieved by connecting to the system using a tablet or other portable handheld device, and running a configuration application while manually adjusting the position and angle of the two-dimensional camera 302, three-dimensional image sensor 304, video projector 306, and optional AOI camera 308.

Figure 4A:
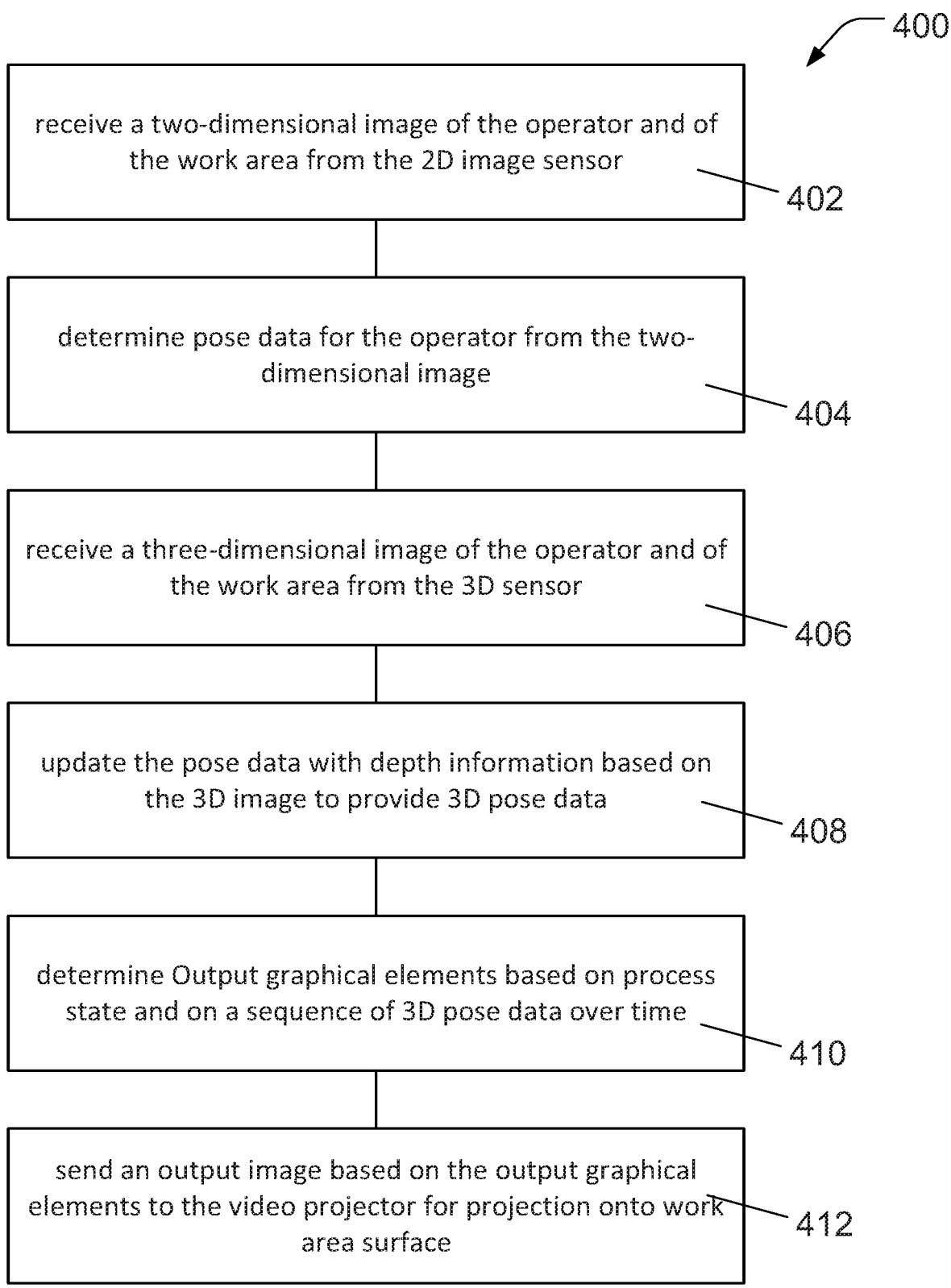
FIGS. 4A-4B show high-level overviews of processes for providing a dynamic, interactive projected augmented reality interface for directing manual processes, in accordance with various disclosed embodiments.

FIG. 4A shows a high-level overview of a process 400 for providing a dynamic, interactive projected augmented reality interface for directing manual processes, in accordance with various embodiments. The process 400 is carried out by the computer (not shown) that is part of the system, as described above.

At 402, the computer receives a two-dimensional image of the operator and at least a portion of the work area from the two-dimensional image sensor or camera. This may, for example, be a two-dimensional "frame" from a video stream captured by a webcam or other conventional digital two-dimensional camera.

Next, at 404, the computer processes the two-dimensional image to determine two-dimensional pose data for the operator. Determining two-dimensional pose data for all of the humans in the image may be done using software such as OpenPose, which is a real-time multi-person key-point detection library for body, face, hands, and foot estimation, developed by researchers at the Carnegie Mellon University Perceptual Computing Lab, of Pittsburgh, Pa. The methods used in OpenPose are described, for example, in Cao, Zhe et al. "Realtime Multi-Person 2D Pose Estimation Using Part Affinity Fields," 2017 IEEE Conference on Computer Vision and Pattern Recognition (CVPR) (2017). Other similar systems for determining two-dimensional pose data from two-dimensional images include AlphaPose, developed at the Shanghai Jiao Tong University Machine Vision and Intelligence Group, in Shanghai, China, and Mask R-CNN, developed by the Facebook AI Research Team, from Facebook, of Menlo Park, Calif.

These two-dimensional pose detection systems generally provide pose data for all of the people in an image. As part of determining two-dimensional pose data for the operator, the system also determines which of the pose data belongs to the operator. The process for making this determination is described in greater detail below.

At 406, the computer receives a three-dimensional image of the operator and work area from the three-dimensional image sensor, such as a depth sensor. This image may be provided in the form of depth data for each pixel in the three-dimensional image.

Next, at 408, the computer updates the two-dimensional pose data with depth coordinates derived from the three-dimensional image to provide three-dimensional pose data. In some embodiments, the pose data is filtered over time and space to provide smoother and more reliable pose data, and to determine estimated current locations of the operator's hands. In some embodiments, this filtering may be accomplished using Kalman filtering (also known as linear quadratic estimation), a known algorithm that uses a series of measurements observed over time, containing statistical noise and other inaccuracies, and produces estimates of unknown variables that tend to be more accurate than those based on a single measurement alone, by estimating a joint probability distribution over the variables for each timeframe.

At 410, the computer uses information on the state of the process that is being performed, and the three-dimensional pose data over time to determine the appropriate output graphical elements (e.g., arrows, boxes, shapes, text, icons, etc.) to be projected by the projected augmented reality system. The output graphical elements may depend on the system's determination of the current step in a manufacturing or assembly process, and what actions need to be taken by the operator to further that step, as well as on expectations for performance, such as whether the operator has fallen behind an expected schedule.

Next, at 412, the output graphical elements are sent as an image to the video projector for projection onto a work surface or other portion of the work area. As will be described in greater detail below, this may involve use of a game engine to map the graphical elements onto a three-dimensional model of work area, in order to appropriately assemble an image and to adjust the image for projection.

This entire process is repeated at a high rate, in order to provide a highly dynamic projected augmented reality user interface. A rate of approximately 10 iterations of this process per second is generally sufficient to provide a dynamic user experience, though higher rates, which may be achieved depending on the processing capabilities of the computer, may provide a more fluid and "organic" user experience. In some embodiments, the system may track operator movements and respond quickly and with a sufficiently high frequency, such that when used with an intuitive interface design, the system may provide the operator with the sense that his or her work area is "alive," and is responding in real-time to his or her actions.

It will be understood that there are other ways of providing a projected augmented reality interface in accordance with various embodiments. For example, some embodiments may be able to obtain three-dimensional pose data directly from three-dimensional image data, without using a two-dimensional camera. It may also be possible to use "smart sensors" that directly output pose data, which may eliminate the need for the system to directly interact with two- or three-dimensional image sensors (though such sensors might be part of the "smart sensor") in order to obtain three-dimensional pose data.

Figure 4B:
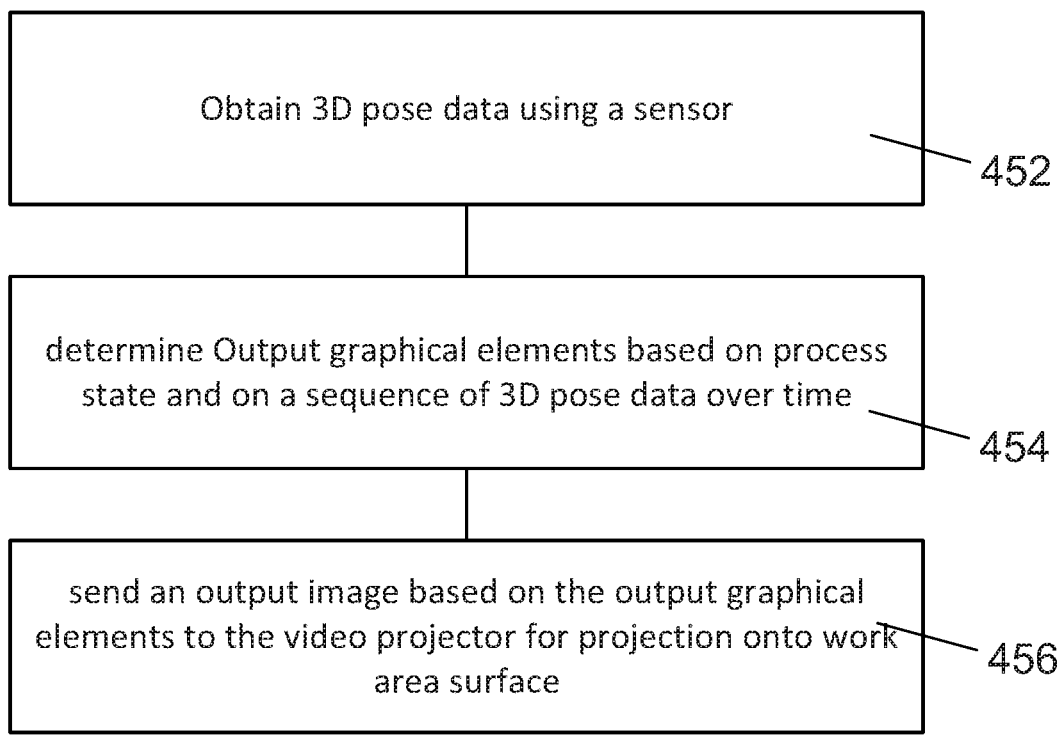

A high-level overview of a process 450 using such alternative means of obtaining pose data is shown in FIG. 4B. The process 450 is carried out by the computer (not shown) that is part of the system, as described above.

At 452, the system obtains three-dimensional pose data on the operator of the system. In some embodiments, this three-dimensional pose data may be provided by a two-dimensional image sensor and a three-dimensional image sensor according to a procedure similar to that described above with reference to items 402-408 in FIG. 4A. Alternatively, some systems may be able to determine three-dimensional pose data based on input from a three-dimensional image sensor. Other embodiments may obtain three-dimensional pose data directly from a "smart sensor" that includes the hardware and software necessary to automatically provide three-dimensional pose data.

At 454, the computer uses information on the state of the process that is being performed, and the three-dimensional pose data over time to determine the appropriate output graphical elements to be projected by the projected augmented reality system. The output graphical elements may depend on the system's determination of the current step in a manufacturing or assembly process, and what actions need to be taken by the operator to further that step, as well as on expectations for performance, such as whether the operator has fallen behind an expected schedule.

Next, at 456, the output graphical elements are sent as an image to the video projector for projection onto a work surface or other portion of the work area. As will be described in greater detail below, this may involve use of a game engine to map the graphical elements onto a three-dimensional model of work area, in order to appropriately assemble an image and to adjust the image for projection.

As above, this entire process is repeated at a high rate, in order to provide a highly dynamic projected augmented reality user interface.

Figure 5:
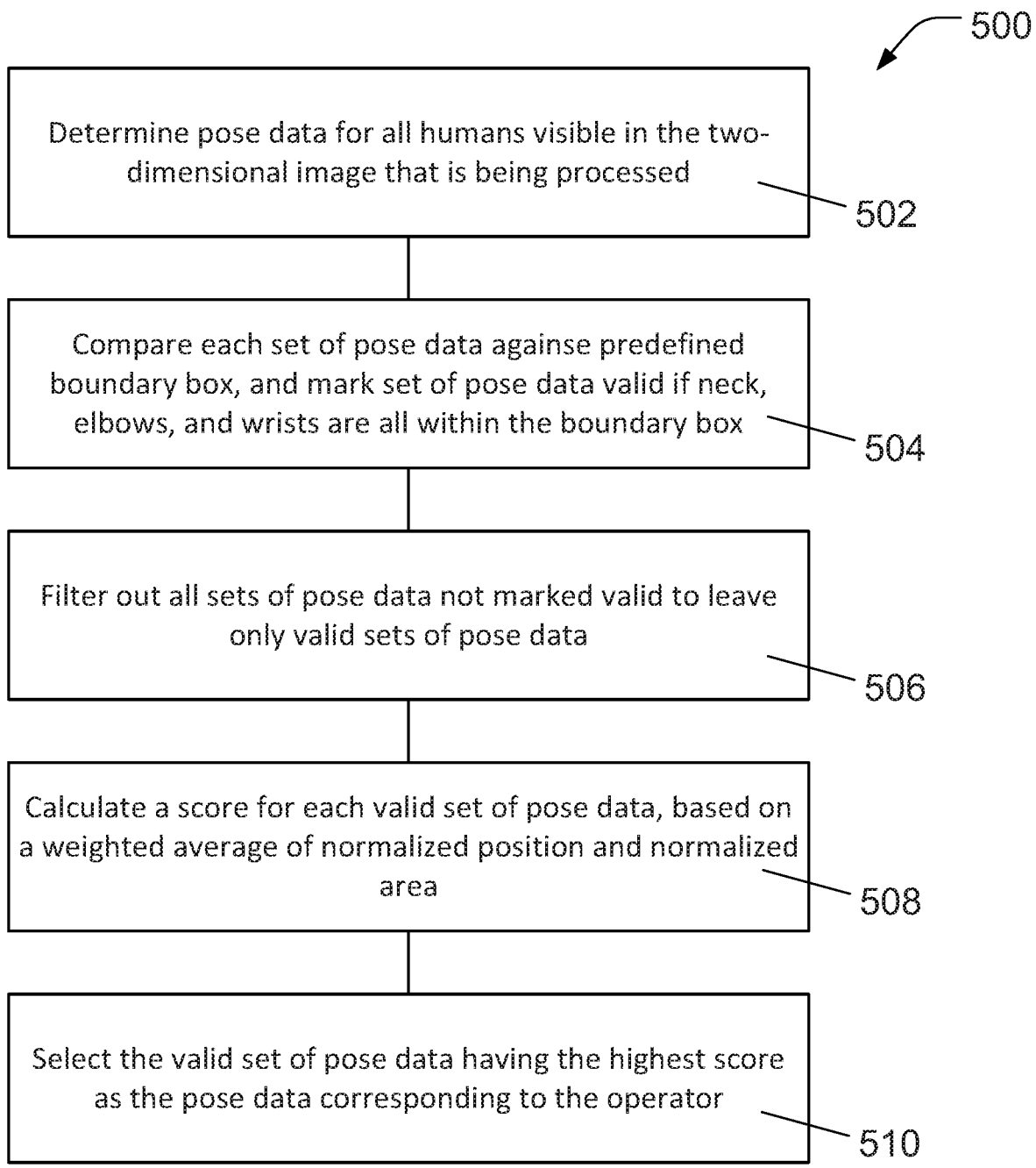
FIG. 5 a process for determining two-dimensional pose data for the operator.

Referring now to FIG. 5, a more detailed process 500 for processing the two-dimensional image to determine two-dimensional pose data for the operator is described. It will be appreciated that the process 500 represents only one example of a process that filters pose data for the operator from all of the pose data in an image, and that many other methods or algorithms could be used to achieve similar results. Additionally, different processes may be used depending on the nature of the pose data available to the system. For example, in some embodiments, three-dimensional pose data may be provided, and three-dimensional image or depth data could be used to filter pose data for the operator from other pose data in an image.

At 502, the computer determines pose data for all humans visible in the two-dimensional image that is being processed. The pose data may take the form of, e.g., key-point skeleton data, in which a pose is represented using the positions of certain "key points" of the body, such as the neck, right shoulder, right elbow, right wrist, etc., and a "skeleton" is formed by lines connecting certain of these key points. As discussed above, this can be achieved using any of a number of existing pose detection libraries, such as OpenPose.

Next, at 504, each set of pose data is compared against a predefined boundary box for the work area. For work areas that involve a seated or largely stationary operator, if the neck, elbows and wrists of the pose data for a single human are within the boundary box, then the set of pose data is deemed to be "valid." If there is only one set of pose data in the entire image, and that set of pose data is "valid," then that pose data is considered to be that of the operator (subject to filtering, such as Kalman filtering, which may be used to filter out erroneous pose data that appear to be humans).

The predefined boundary box may be defined, for example, during a set-up process for a work area, either automatically, or manually by a technician. The configuration of the boundary box may be individually set for each separate work area, depending, e.g., on the camera location and angle.

Figure 6A:
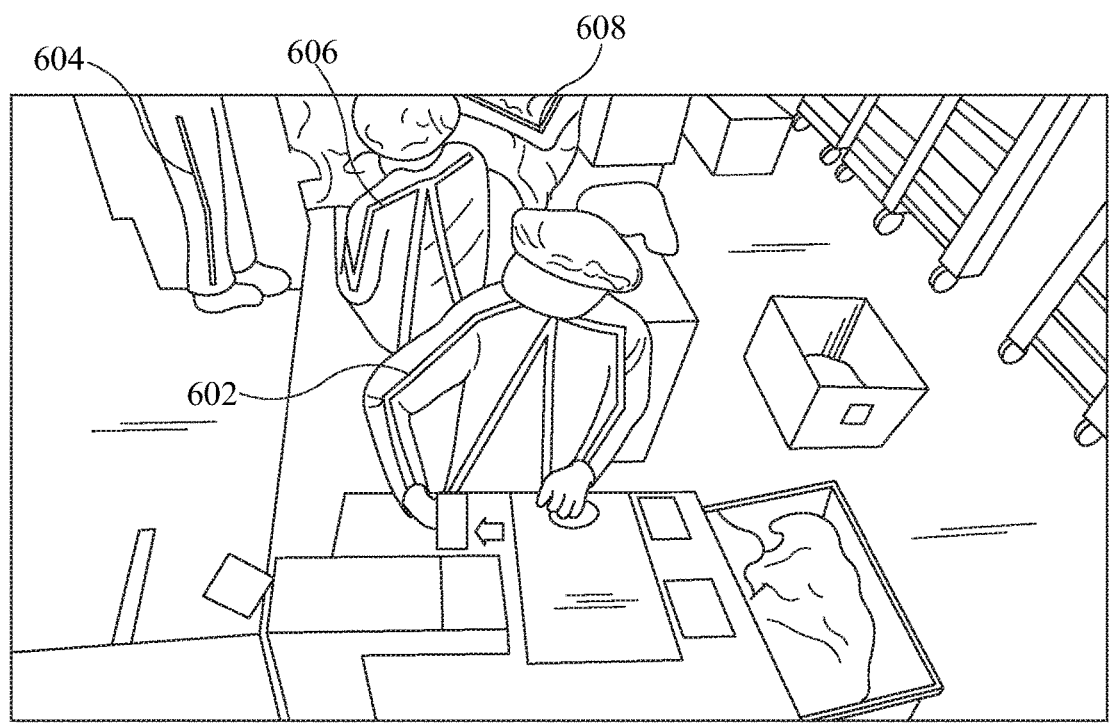
FIGS. 6A-6D show images corresponding to various portions of the process of FIG. 5.
Figure 6B:
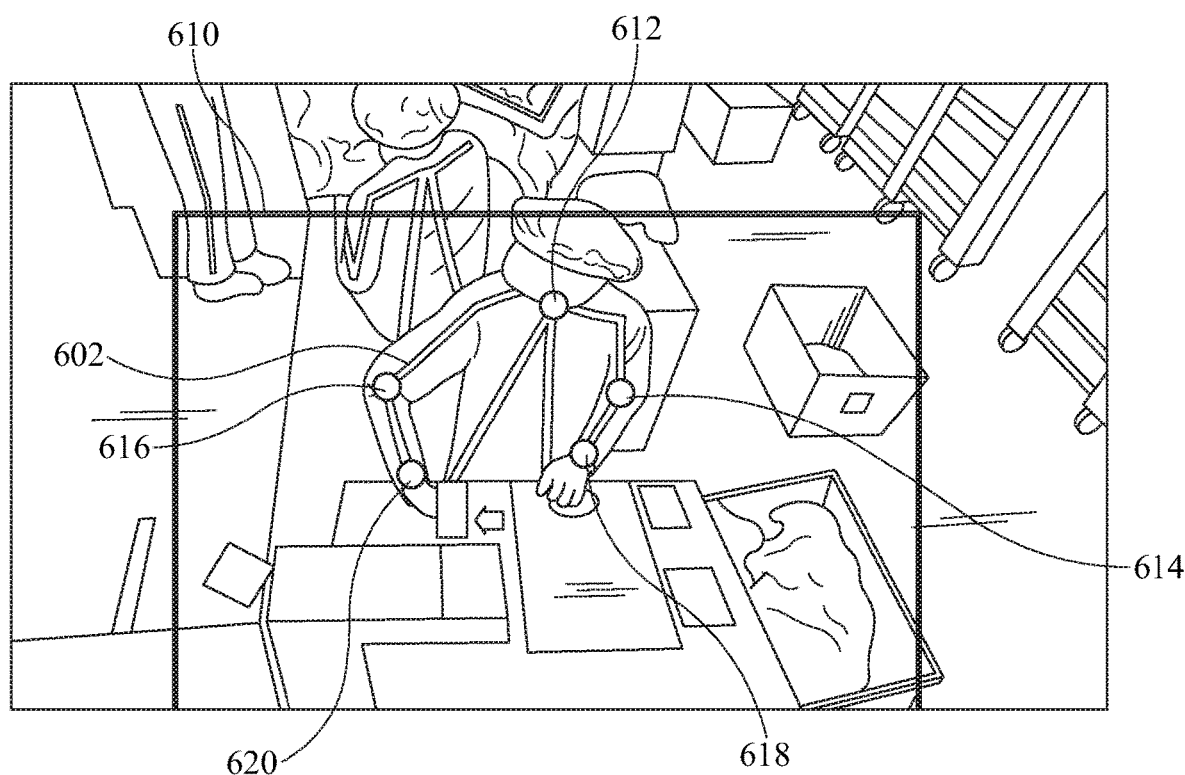
Figure 6C:
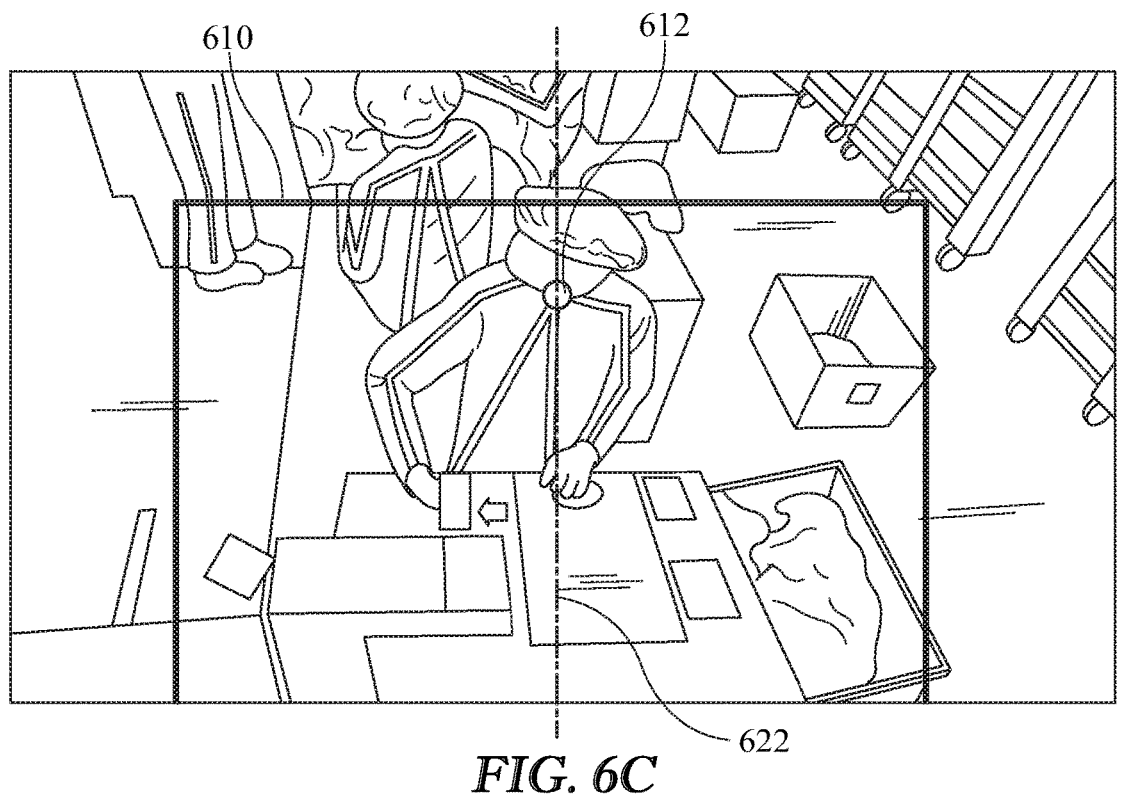
Figure 6D:
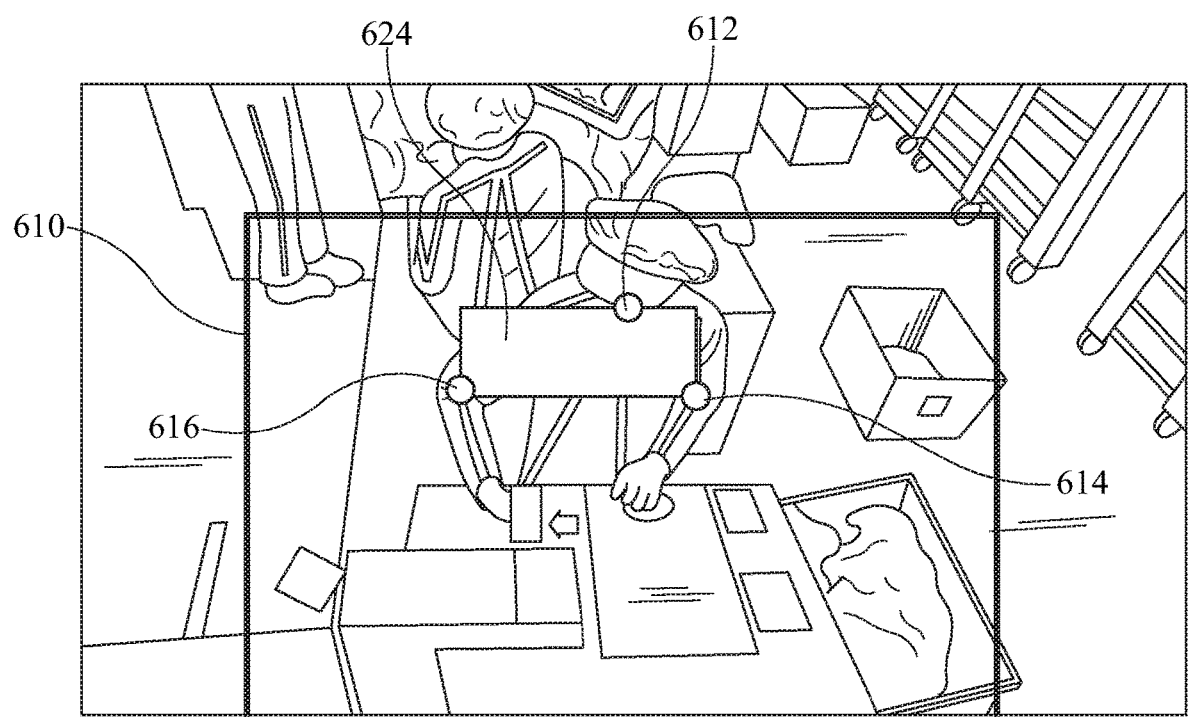

Additionally, it will be understood that although the predefined "boundary box" is described as a "box," and is shown in FIGS. 6B-6D, below, as being rectangular, other shapes could be used to define the boundary box for a work area. Further, although the pose data is discussed as being represented by a "key-point skeleton", other forms of pose data could also be used. A key-point skeleton is merely one kind of pose data that is provided by the OpenPose library. Other pose detection libraries may provide pose data in other forms. For example, Mask R-CNN, which is mentioned above as a pose detection library, may provide pose data in the form of pixel masks. It will be understood that the process 500 could be readily adapted to be used with these other forms of pose data.

At 506, if there is more than one set of pose data in the image, all sets of pose data that are not "valid" are filtered out, leaving only "valid" sets of pose data.

At 508, the computer calculates a "score" for each remaining set of "valid" pose data. In some embodiments, this score is calculated as a weighted average, based on the normalized position and normalized area, as defined below. For example, the normalized position may be given a weight of 0.6 (or 60%), and the normalized area may be given a weight of 0.4 (or 40%). This weighting will mean that human poses that are located closer to the center of the workspace and closer to the camera (i.e., covering a larger area) will receiver higher "scores", with more emphasis on position.

In some embodiments, the normalized position is a measure of how close the neck in a set of pose data is located to a half-way point between the right and left edges of the boundary box. The normalized position is 1.0 if the neck is positioned horizontally on the half-way point between the left and right edges of the boundary box, and drops linearly to 0.0 if the neck is positioned at either the left or right edges of the boundary box.

In some embodiments, the normalized area is a measure of the area of a reference "body area" divided by the total area of the boundary box. For example, the reference "body area" may be the area of a rectangular reference box with a height equivalent to the vertical distance in the two-dimensional image between the neck and the left elbow, and a width equivalent to the horizontal distance in the two-dimensional image between the two elbows. For two-dimensional images, this normalized area may represent the closeness of a person represented by a set of pose data to the camera that took the image (though this will be an imperfect estimate, since the normalized area will vary both with closeness to the camera and with the size of the person).

Finally, at 510, the computer will select the "valid" set of pose data having the highest "score" as the pose data corresponding to the operator.

It will be understood that other methods could also be used for recognizing or distinguishing the operator in accordance with various embodiments. For example, the two-dimensional image data and/or three-dimensional image data could be used with known face recognition algorithms to recognize an authorized or registered operator by his or her face. Other methods of filtering the pose data may also be used.

To assist in understanding the process 500 of FIG. 5, FIGS. 6A-6D show images corresponding to various portions of the process 500. FIG. 6A shows a view of an image that has been processed to obtain pose data 602, 604, 606, and 608 (shown here as key-point skeleton data) for all humans found in the image.

FIG. 6B shows a boundary box 610 of a work area, and the key points of the pose data 602 for the neck 612, elbows 614 and 616, and wrists 618 and 620. Since these key points for the pose data 602 are all located inside the boundary box 610, the pose data 602 will be considered "valid."

FIG. 6C illustrates the calculation of the normalized position. The distance of the horizontal position of the key-point for the neck 612 from a horizontal half-way point 622 between the left and right edges of the boundary box 610 is used to compute the normalized position. In FIG. 6C, since the key-point for the neck 612 is close to the horizontal half-way point 622, the normalized position may be a high value, close to 1.0.

FIG. 6D illustrates the calculation of the normalized area. The reference body area is the area of the rectangular reference box 624, which has a height equivalent to the vertical distance between the key-point for the neck 612 and the key-point for the left elbow 614, and a width equivalent to the horizontal distance between the key-point for the left elbow 614 and the key-point for the right elbow 616. The normalized area is calculated by dividing the area of the rectangular reference box 624 by the area of the boundary box 610.

Figure 7:
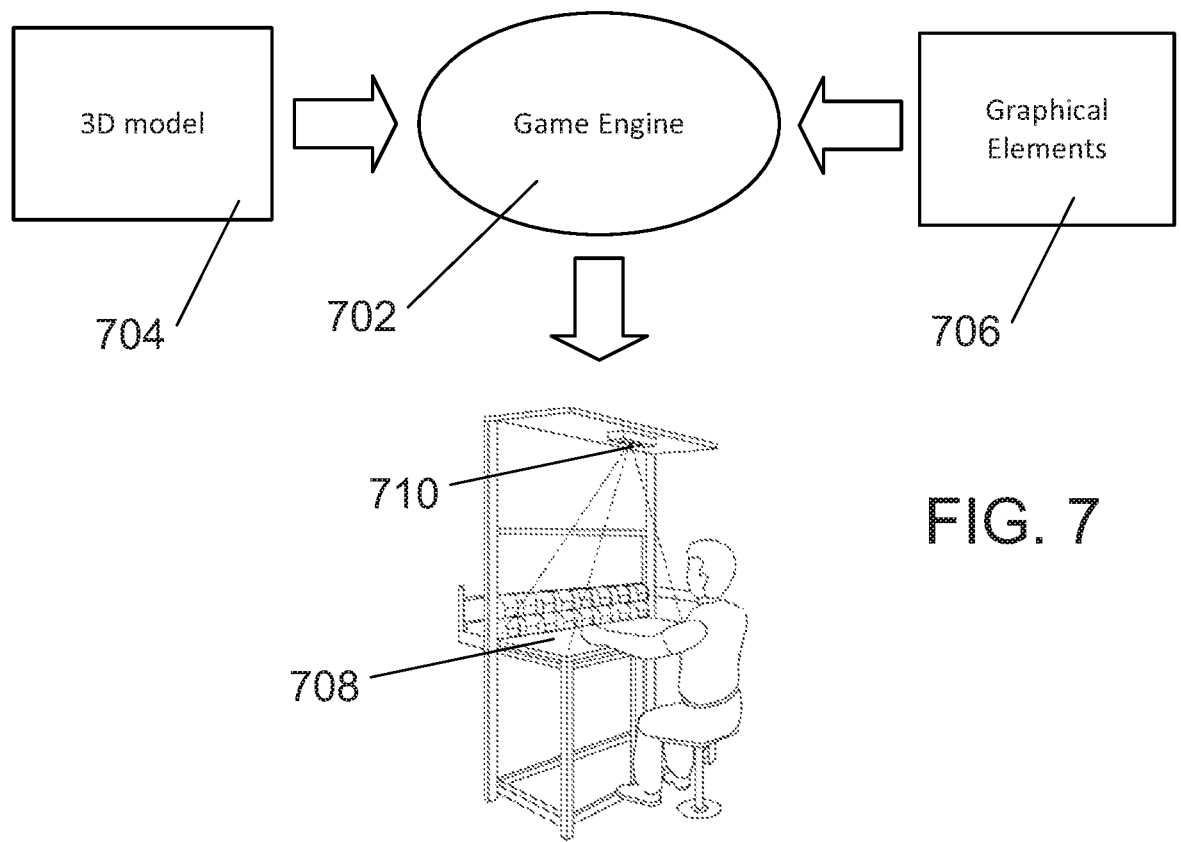
FIG. 7 depicts an overview of the use of a game engine in accordance with various disclosed embodiments.

Referring to FIG. 7, a more detailed explanation of the use of a game engine in accordance with various embodiments is described. As discussed above with reference to FIG. 4, when an output image is sent to the video projector for projection onto a work surface or other portion of the work area, a game engine may be used to map graphical elements onto a three-dimensional model of the work area, in order to generate a spatially correct image for projection.

One difficulty with projecting an image onto a work surface or other portion of a work area is that the projector can never be perfectly aligned with the work surface, so images projected will always be mis-scaled or misaligned unless there is some form of correction. Conventionally, to display a graphical indicator at a particular location and size on the work surface, the exact position and angle of the projector could be predetermined (for example, when the system is set up), and the image could then be pre-warped such that it falls correctly on the surface. The situation is complicated further if the surface onto which the image is to be projected is not flat, or is subject to change.

In accordance with various embodiments, these difficulties can be handled using a game engine. A three-dimensional model of the work surface or other portion of the work area can be built within a virtual space of the game engine. This model can be built to represent surfaces that are not flat, and could even be dynamically changed, using, e.g., three-dimensional image data from a three-dimensional camera or depth sensor that is used with the system. A virtual camera may be positioned within the model, either manually or automatically, at the same distance and angle, and with the same optical parameters as the real-life video projector. Note that if the video projector can move (as will be described below), it is also possible to dynamically update the position, distance, and angle of the virtual camera within the virtual space of the game engine. The graphical elements that are to be projected are then mapped onto the three-dimensional model of the work surface or other portion of the work area. To project the image correctly onto the workspace, the image that the virtual camera in the game engine "sees" is sent to the video projector, for projection onto the real-world work surface or other portion of the work area.

An overview of this use of a game engine is shown in FIG. 7. A game engine 702 takes as input the graphical elements 706 that are to be projected onto the workspace surface 708 or other portion of a work area by a video projector 710. A three-dimensional model 704 of the work surface or work area onto which the graphical elements are to be projected, including a virtual camera/"projector" located in the three-dimensional model at the position and at the angle of the projector 710 is then used by the game engine to provide a spatially correct image for projection onto the work surface 708 or other portion of the work area. The game engine forms and adjusts the image by mapping the graphical elements 706 onto the three-dimensional model at the virtual location where the image is to be projected, and then by projecting the image that is "seen" by the virtual camera in the three-dimensional model using the video projector 710.

A game engine, such as the game engine 702, may also be used to provide dynamic, high quality images, having a high degree of realism, by using the built-in capabilities of a game engine to handle, e.g., lighting and animation. Game engines are generally designed to provide realistic, high quality images at high frame rates, making them well suited for use with the projected augmented reality system of the disclosure.

Game engines that would be suitable for this use are readily available. For example, the Panda3D game engine, provided on an open source basis by the Carnegie Mellon University Entertainment Technology Center, of Pittsburgh, Pa., could be used in accordance with the above-described embodiments.

Figure 8:
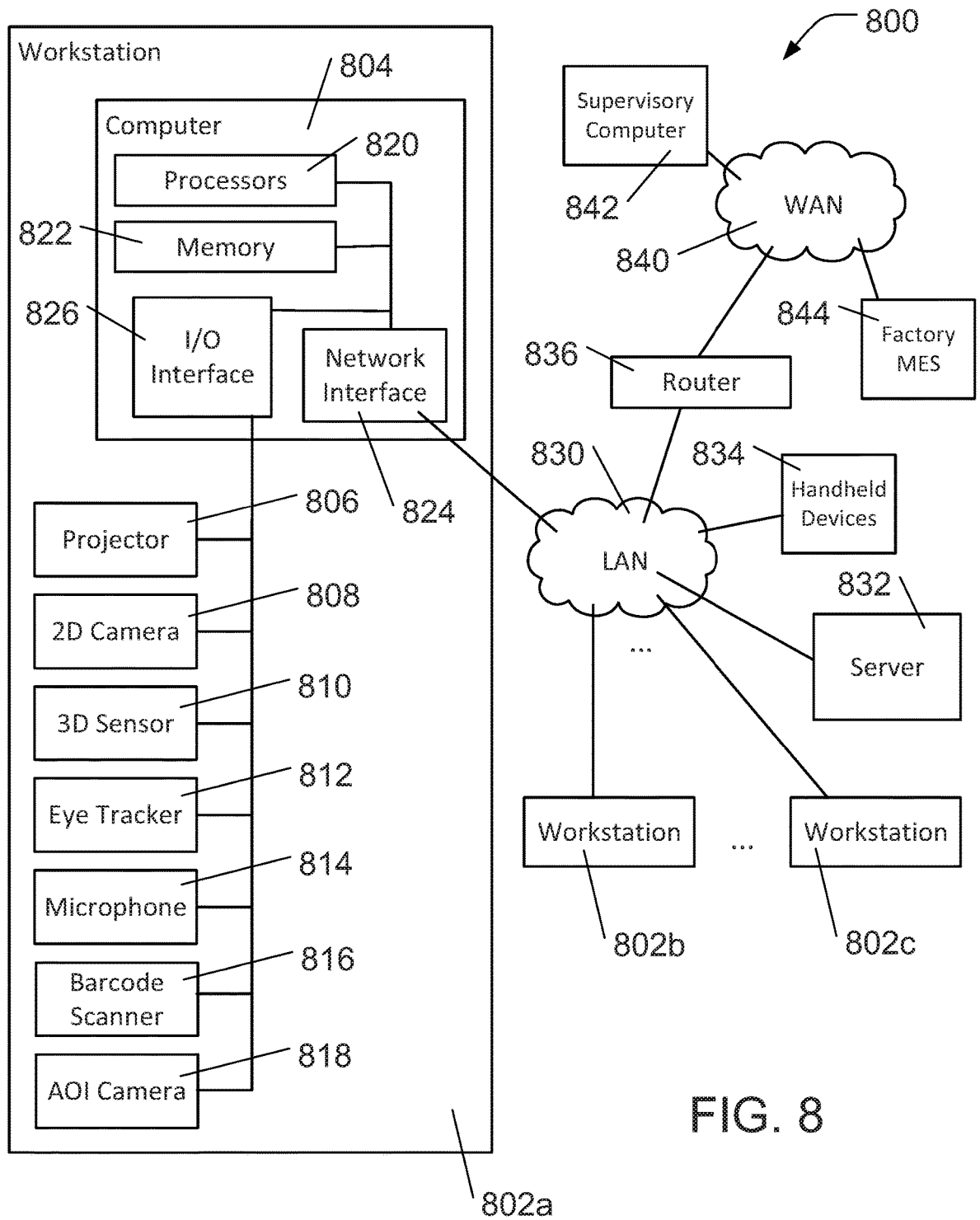
FIG. 8 shows an example computer and network environment in which the projected augmented reality system of the disclosure may operate.

FIG. 8 shows an example computer and network environment in which the projected augmented reality system of the disclosure may operate. The network environment 800 includes workstations 802a-802c, each of which is a work area with a projected augmented reality device according to the disclosure. The workstation 802a is shown in greater detail, and includes a computer 804, a video projector 806, a two-dimensional camera 808, and a three-dimensional image sensor 810. The operation of these components of the projected augmented reality system are described in detail, e.g., with reference to FIGS. 2 and 3. Additionally, there may be optional components, such as an eye tracker 812, a microphone 814, a bar code scanner 816, and/or an AOI camera 818. As with the other components, the operation of these optional components is described herein, for example, with reference to FIGS. 2 and 3.

The computer 804 may include one or more processors 820, a memory 822, a network interface 824 (which may be a wired or a wireless network interface), and one or more I/O interfaces 826, which connect the computer 804 to the other components of the projected augmented reality system. The I/O interfaces 826 may include USB interfaces, various video interfaces, such as an HDMI interface, wireless interfaces, such as Bluetooth or WiFi interfaces, or other interfaces having sufficient bandwidth to communicate between the computer and various components of the augmented system, either through a wired or a wireless connection. It will be understood that in some embodiments, the computer 804 may also include a graphical processing unit (GPU, not shown), a neural network processor (NNP, not shown), a tensor processing unit (TPU, not shown), or similar, acting as a co-processor to the main processors 820 and focusing, e.g., on machine learning tasks.

The workstations 802a-802c are connected to a local area network (LAN) 830, generally through a network interface, such as the network interface 824. The workstations 802a-802c may communicate over the LAN 830 with a server 832. The server 832 may communicate with the workstations 802a-802c to provide updates to the software, processes, interfaces, 3D models, or other data or programming used by the workstations 802a-802c. Additionally, the server 832 may collect various data from the workstations 802a-802c, such as data on the performance of the operators of the workstations 802a-802c, information on the products being produced (e.g., quality information, quantity information, etc.), or other information related to the operators of the workstations 802a-802c or to the processes used or products produced at the workstations 802a-802c. For example, in some embodiments, a process sequence that was programmed on one workstation could be duplicated on other workstations that are running the same product, via the server 832. In some embodiments, all data from each workstation in a facility may be stored centrally on the server 832, which may increase flexibility and security.

In some embodiments, other computing devices or networkable equipment (not shown), as well as handheld devices 834 may be connected to the LAN 830. The handheld devices 834 may include devices such as tablets and smartphones, which may be connected wirelessly (e.g., through a WiFi interface) to the LAN 830. These handheld devices may run software allowing a technician to calibrate, configure, debug, and test the workstations 802a-802c via the server 832.

In some embodiments, the LAN 830 may be connected to other local area networks (not shown) and/or to a wide area network (WAN) 840, such as the Internet or a virtual private network (VPN) through one or more routers 836. A supervisory computer 842 and/or a factory manufacturing execution system (MES) 844 may be connected to the WAN 840. The supervisory computer 842 may be used in some embodiments to remotely monitor all workstations, possibly in multiple factories or facilities. The factory MES 844 includes information on which products should be run at which factories and workstations at a particular time, at which target speeds, etc. This information can be remotely accessed from the factory MES 844 by the server 832 (as well as similar servers at the same or other factories or facilities), which can then feed this information to the workstations 802a-802c. In some embodiments, the supervisory computer 842 and/or the factory MES 844 may be local to a factory or facility, and may be connected to the LAN 830, rather than to the WAN 840.

There are, of course, many other network environments with which embodiments of the disclosure could be used, and the network environment 800 is used only for purposes of illustration. Alternatively, in some embodiments, the projected augmented reality system of the disclosure could run as a standalone system, without being connected to a network.

There is thus disclosed a system of one or more computers that can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

As can be seen from the configuration of the computer 804, as shown in FIG. 8, in normal production, a workstation will not include a mouse or keyboard. Operators may use other ways of issuing commands or making requests. For example, in some embodiments, a barcode scanner may be used to issue commands. For example, the operator of a workstation may scan various barcodes posted in the work area to start or stop a process or to select a product type. Similarly, as discussed above, a microphone may be used to issue voice commands to the system. Both of these modes of issuing commands require hardware beyond what is used for monitoring poses. In particular, issuing commands using barcodes uses an optional barcode scanner, and issuing voice commands uses an optional microphone.

Using substantially the same hardware that is used for tracking the operator's poses, commands may be issued using hand gestures. Some pose detection systems, such as OpenPose, which is discussed above, are able to recognize the positions of a person's fingers, as well as the main body parts. Thus, by using substantially the same pose detection systems that are used by the projected augmented reality system to track the poses and movement of the operator, an operator's hand gestures may be tracked for use in issuing commands.

Figure 9:
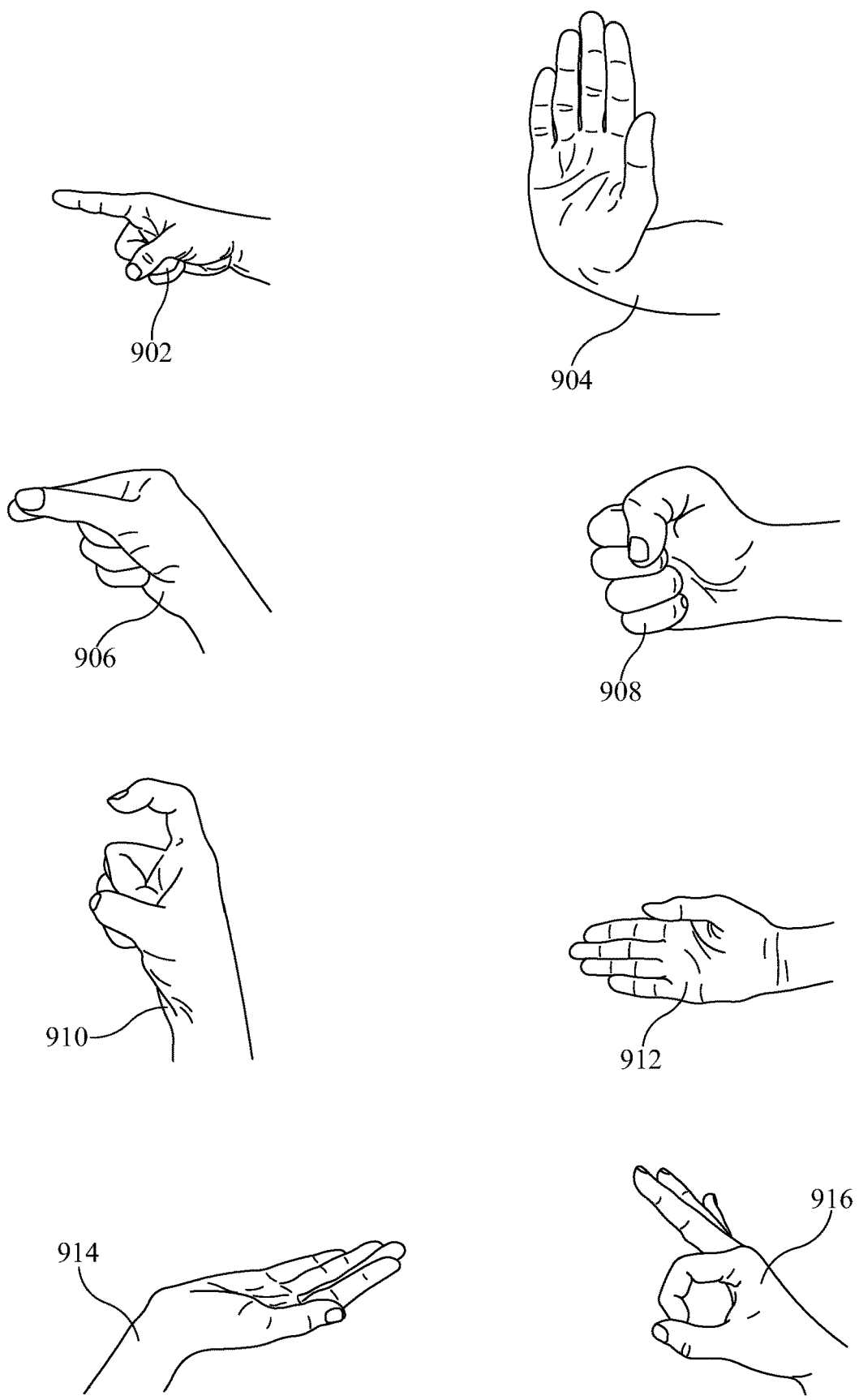
FIG. 9 illustrates hand gestures that can be used for various commands or requests.

As shown in FIG. 9, different hand gestures can be used for different commands or requests. For example, the hand gesture 902 may be used to command the system to start production, while the hand gesture 904 may be used as a command to halt production. The hand gesture 906 may be used, for example, to request a material refill, and the hand gesture 908 could be used to request help (i.e., a request to send a technician). The hand gesture 910 may be used to command the system to change the product. The hand gestures 912 and 914 may be used to command the system to proceed to a next item or a next step in a process, and to command the system to return to a previous item or a previous step in a process, respectively. The hand gesture 916 could be used to select an item in the interface.

To assist the system to distinguish hand gestures that are intended as commands or requests from hand positions that are part of an operator performing his or her tasks, in some embodiments, the system may look for hand gesture commands when the system is in a particular state or when the operator is at a particular step in a sequence. In some embodiments, gesture recognition can be triggered when the operator's hands are in a certain location on a work surface, or in the work area. In some embodiments, one hand may be used to indicate that a hand gesture is being used, while the other hand makes a gesture to issue a command. If the combination of hand positions is one that will not normally occur during the operator's normal work, use of such combination gestures may also be used to distinguish hand gesture commands from "normal" hand movement.

It will, of course, be understood that the hand gestures and commands discussed with reference to FIG. 9 are only for purposes of illustration, and that many different hand gestures and commands or requests could be used in accordance with various embodiments.

Figure 10A:
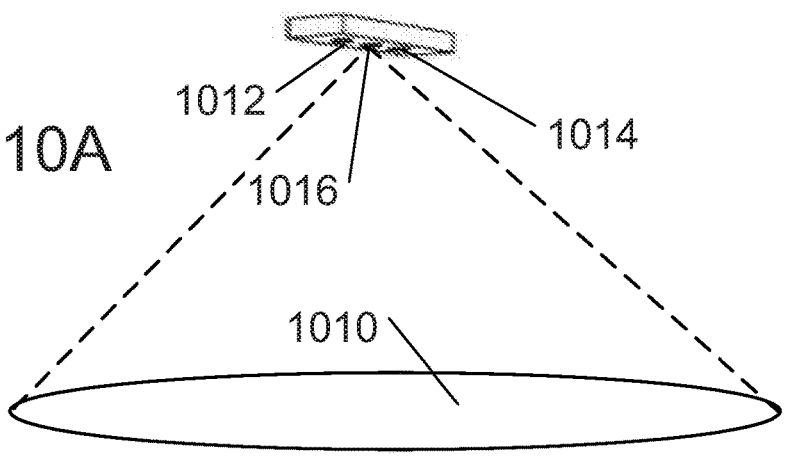
FIGS. 10A-10C, illustrate several ways of handling work areas in which the operator regularly moves around the work area, in accordance with various disclosed embodiments.
Figure 10B:
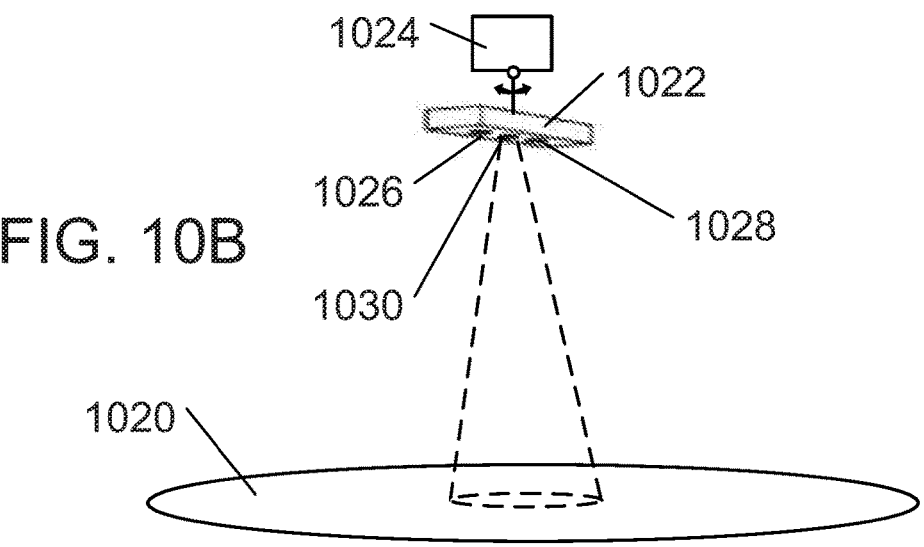
Figure 10C:
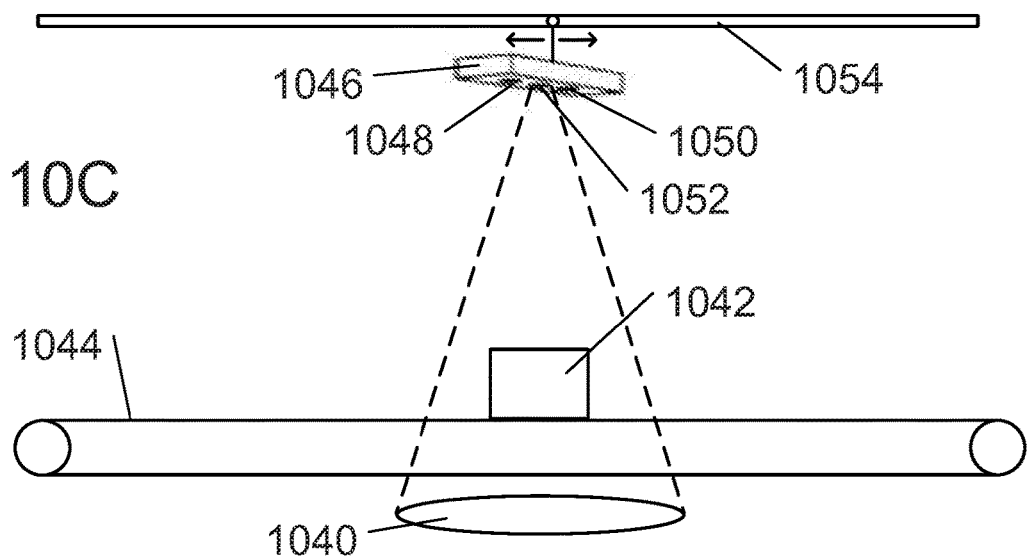

Referring now to FIGS. 10A-10C, several ways of handling work areas in which the operator regularly moves around the work area are described. Although many manufacturing or assembly processes are performed by a seated, stationary operator, there are also processes in which the work area may be large, and the operator (and possibly others) regularly moves within the work area. As will be seen below, there may also be setups in which the "work area" itself moves, such as when the work area is defined as an area around a work piece that is moving on, e.g., a conveyor belt. In such large (or even moving) work areas, it is possible that the operator may regularly change during the process, so the projected augmented reality system may dynamically change who it regards as the operator whose poses are tracked.

FIG. 10A shows an example use of a stationary projected augmented reality system according to some embodiments to cover a large work area 1010 in which the operator (not shown) moves within the work area. To track the movement of an operator in the work area 1010, a camera 1012 having a very wide-angle view may be used, and may be mounted at a great enough height for the entire work area 1010 to be within view of the camera 1012. A three-dimensional image sensor 1014 also has a wide-angle view that covers most or substantially all of the work area 1010, and a projector 1016 is configured to project over a wide area, covering substantially all of the work area 1010. In some embodiments, as well as the wide-area cameras, sensors, and projectors shown in FIG. 10A, multiple two-dimensional cameras (not shown), three-dimensional image sensors (not shown), and projectors (not shown) may be focused on particular parts of the work area 1010, if greater focus on those particular parts of the work area 1010 are needed.

FIG. 10B shows an example use of a limited-motion projected augmented reality system to cover a large work area 1020 in which the operator (not shown) moves around the work area. In some embodiments, a single housing 1022, such as is described above with reference to FIG. 3, may be mounted on a motorized mount 1024 that can pivot the entire housing 1022 under the control of a computer (not shown), to follow the movement of the operator within the work area 1020. The housing 1022 may include a two-dimensional camera 1026, a three-dimensional camera 1028, and a projector 1030 that are aimed at the portion of the work area in which the operator is working by the computer (not shown) sending signals to cause the motorized mount 1024 to change the position of the housing 1022. As the housing 1022 moves, the position and/or angle of the virtual camera (not shown) in the 3D model (not shown) of the work area in the game engine (not shown), as described above, may also be adjusted to correspond to the motion of the housing 1022.

Although the motorized mount 1024 is described as pivoting the housing 1022 to track the motion of the operator, other embodiments may move the housing 1022 in other ways. For example, the housing 1022 could be attached to a motorized mount that is moved along tracks (not shown) under control of the computer (not shown) to track the operator. Alternatively, other motorized mounts could be used to move and pivot the housing 1022 to track the movement of the operator. For example, in some embodiments, the housing 1022 could be moved within a facility (or even in an outdoor area), e.g., by mounting the housing 1022 on an automated drone (not shown), either tethered to a power source or free-flying, or on another automated moving conveyance (not shown).

Because the projected augmented reality system shown in FIG. 10B moves to track the movement of an operator, it does not necessarily "see" the entire work area at once. Thus, it may not capture the entry into the work area of a new operator in processes in which the operator changes during the process. This can be addressed, for example, by using a command, such as a hand gesture or voice command of the "current" operator to cause the system to scan the work area for a new operator. Alternatively, operators may wear a tag or beacon that can be tracked by the system, so that the system will know when a new operator has entered the work area without "seeing" the new operator with the two-dimensional camera or three-dimensional image sensor. In some embodiments, facial recognition may be used to automatically detect an operator from a pre-defined list of authorized operators.

FIG. 10C shows a work area 1040, in which the work area is defined by proximity to a moving work piece 1042, that moves on a conveyor belt 1044 (though other conveyances, such as motorized carts (not shown), robots (not shown), etc. could also be used to move the work piece). To cover the work area 1040, which moves with the work piece 1042, a housing 1046, containing a two-dimensional camera 1048, a three-dimensional image sensor 1050, and a projector 1052 is moved along a track 1054 that follows the motion of the work piece 1042 along the conveyor belt 1044. As discussed above, other conveyances (not shown) could also be used to move the housing 1046 to follow the motion of the work piece 1042. Alternatively, a series of stationary projected augmented reality systems (not shown) or limited-motion projected augmented reality systems (not shown), such as are described above with reference to FIGS. 10A and 10B, could be disposed along the path of the conveyor belt 1044, with coverage of the work area 1040 passing between the stationary and/or limited-motion systems as the work piece 1042 moves between areas covered by the multiple stationary and/or limited-motion projected augmented reality systems.

There is thus disclosed a projected augmented reality system and methods with pose tracking for directing manual processes. One general aspect includes a projected augmented reality system for directing an operator to perform a manual process, including: a video projector, configured to project a dynamically-changing image onto a surface within a work area of the operator; an image sensor configured to capture two-dimensional images of the operator and of the work area; a depth sensor configured to capture three-dimensional images of the operator and of the work area; and a computer communicatively connected to the video projector, the image sensor, and the depth sensor, the computer including a memory and a processor, the memory including instructions that when executed by the processor cause the computer to: receive a two-dimensional image of the operator and of at least a portion of the work area from the image sensor; determine pose data for the operator from the two-dimensional image; receive a three-dimensional image of the operator and of the work area from the depth sensor; update the pose data with depth coordinates based on the three-dimensional image to provide three-dimensional pose data; determine an output graphical element based on a sequence of three-dimensional pose data over time, and on a current production state; and send an output image based on the output graphical element to the video projector for projection onto the surface.

Implementations may include one or more of the following features. The projected augmented reality system where the image sensor and the depth sensor are contained within a single housing. The projected augmented reality system where the single housing further contains the video projector. The projected augmented reality system where the single housing further contains the computer. The projected augmented reality system where the memory includes instructions that when executed by the processor cause the computer to determine pose data for the operator from the two-dimensional image by: determining pose data for all humans visible in the two-dimensional image; and filtering pose data for the operator from pose data of other humans visible in the two-dimensional image. The projected augmented reality system where the memory includes instructions that when executed by the processor cause the computer to filter pose data for the operator from pose data of other humans visible in the two-dimensional image based on a position or an area of at least a portion of the pose data. The projected augmented reality system where the memory includes instructions that when executed by the processor cause the computer to filter pose data for the operator from pose data of other humans visible in the two-dimensional image based on a position within a predefined boundary box or an area within the predefined boundary box of at least a portion of the pose data. The projected augmented reality system where the memory includes instructions that when executed by the processor cause the computer to filter pose data for the operator from pose data of other humans visible in the two-dimensional image based on a weighted average of a normalized measure of the position within the predefined boundary box and a normalized measure of the area within the predefined boundary box of at least a portion of the pose data. The projected augmented reality system where the memory includes instructions that when executed by the processor further cause the computer to: determine estimated three-dimensional locations of the operator's hands based on the three-dimensional pose data; and where the memory includes instructions that when executed by the processor cause the computer to determine an output image based on a sequence of estimated three-dimensional locations of the operator's hands over time. The projected augmented reality system where the memory includes instructions that when executed by the processor further cause the computer to filter the three-dimensional pose data. The projected augmented reality system where the memory includes instructions that when executed by the processor cause the computer to filter the three-dimensional pose data using kalman filtering. The projected augmented reality system where the memory includes instructions that when executed by the processor further cause the computer to map the output graphical element into the output image for projection onto the surface using a three-dimensional model containing a representation of at least a portion of the work area and of the video projector. The projected augmented reality system where the memory includes game engine software, and where the processor uses the game engine software to cause the computer to map the output graphical element into the output image for projection onto the surface using the three-dimensional model. The projected augmented reality system further including an automated optical inspection camera communicatively connected to the computer, and where the memory further includes instructions that when executed by the processor cause the computer to: receive an inspection image from the automated optical inspection camera; and determine whether a step in the manual process has been correctly executed based on the inspection image. The projected augmented reality system where the memory includes instructions that when executed by the processor further cause the computer to: determine pose data for the operator that includes data for the operator's fingers from either the two-dimensional image or the three-dimensional image, or both the two-dimensional image and the three-dimensional image; determine a gesture based on the pose data for the operator's fingers; and determine a command based on the gesture. The projected augmented reality system further including an eye tracking device communicatively connected to the computer. The projected augmented reality system where the memory further includes instructions that when executed by the processor cause the computer to: receive an eye tracking signal indicative of the operator's gaze from the eye tracking device; and determine a command in a projected augmented reality user interface based on the operator's gaze over a period of time. The projected augmented reality system where the memory further includes instructions that when executed by the processor cause the computer to: receive an eye tracking signal indicative of the operator's gaze from the eye tracking device; and use the eye tracking signal to determine whether the operator has properly inspected an assembly by scanning it with his eyes. The projected augmented reality system where the memory further includes instructions that when executed by the processor cause the computer to: receive an eye tracking signal indicative of the operator's gaze from the eye tracking device; and use the eye tracking signal to estimate a degree of engagement of the operator by measuring how closely the operator looks at his work during operations, and how often he looks away from his work. The projected augmented reality system further including a microphone communicatively connected to the computer, and where the memory further includes instructions that when executed by the processor cause the computer to: receive a voice signal of the operator from the microphone; and interact with the operator based on the voice signal. The projected augmented reality system further including a barcode scanner communicatively connected to the computer, and where the memory further includes instructions that when executed by the processor cause the computer to: receive a command based on a barcode scanned with the barcode scanner. The projected augmented reality system where the computer is connected to a network. The projected augmented reality system where all data from the projected augmented reality system is stored on a server connected to the network. The projected augmented reality system where a supervisory computer connected to the network is configured to remotely monitor the projected augmented reality system. The projected augmented reality system where a factory manufacturing execution system provides production information over the network for use by the projected augmented reality system. The projected augmented reality system where a handheld device connected to the network is used to configure the projected augmented reality system. The projected augmented reality system where at least the image sensor and the depth sensor are mounted on a motorized mount that is communicatively connected to the computer, and where the memory further includes instructions that when executed by the processor cause the computer to move the motorized mount to track a position of the operator within the work area. The projected augmented reality system where at least the image sensor and the depth sensor are mounted on a motorized mount that is communicatively connected to the computer, and where the memory further includes instructions that when executed by the processor cause the computer to move the motorized mount to track a position of a work piece. The projected augmented reality system where the memory further includes instructions that when executed by the processor cause the computer to identify the operator based on facial recognition. The projected augmented reality system where the memory further includes instructions that when executed by the processor cause the computer to use either the two-dimensional image or the three-dimensional image, or both the two-dimensional image and the three-dimensional image for facial recognition. Implementations of the described techniques may include hardware, a method or process, or computer software on a non-transitory computer-accessible medium.

Another general aspect includes a method for using a projected augmented reality system for directing an operator to perform a manual process, including: receiving by a computer a two-dimensional image of the operator and of at least a portion of a work area from an image sensor; determining by the computer pose data for the operator from the two-dimensional image; receiving by the computer a three-dimensional image of the operator and of the work area from a depth sensor; updating by the computer the pose data with depth coordinates based on the three-dimensional image to provide three-dimensional pose data; determining by the computer an output graphical element based on a sequence of three-dimensional pose data over time, and on a current production state; and projecting an output image based on the output graphical element onto a surface within the work area using a video projector. Other embodiments of this aspect include corresponding computer systems, apparatus, and computer programs recorded on one or more computer storage devices or other non-transitory computer-accessible media, each configured to perform the actions of the methods.

Implementations may include one or more of the following features. The method where determining by the computer pose data for the operator from the two-dimensional image includes: determining pose data for all humans visible in the two-dimensional image; and filtering pose data for the operator from pose data of other humans visible in the two-dimensional image. The method further including mapping by the computer the output graphical element into the output image for projection onto the surface using a three-dimensional model containing a representation of at least a portion of the work area and of the video projector. The method where mapping by the computer the output graphical element into the output image for projection onto the surface includes using game engine software to map the output graphical element into the output image for projection onto the surface using the three-dimensional model. The method further including: determining, by the computer, pose data for the operator that includes data for the operator's fingers from either the two-dimensional image or the three-dimensional image, or both the two-dimensional image and the three-dimensional image; determining, by the computer, a gesture based on the pose data for the operator's fingers; determining, by the computer, a command based on the gesture; and executing the command. Implementations of the described techniques may include hardware, a method or process, or computer software on a non-transitory computer-accessible medium.

A further general aspect includes a projected augmented reality system for directing an operator to perform a manual process, including: a video projector, configured to project a dynamically-changing image onto a surface within a work area of the operator; a sensor; and a computer communicatively connected to the video projector and the sensor, the computer including a memory and a processor, the memory including instructions that when executed by the processor cause the computer to: obtain three-dimensional pose data using the sensor; determine an output graphical element based on a sequence of three-dimensional pose data over time, and on a current production state; and send an output image based on the output graphical element to the video projector for projection onto the surface.

Implementations may include one or more of the following features. The projected augmented reality system where the sensor includes a three-dimensional image sensor, and where the memory includes instructions that when executed by the processor cause the computer to: receive three-dimensional image data from the three-dimensional image sensor; and obtain three-dimensional pose data by determining three-dimensional pose data based, at least in part, on the three-dimensional image data. The projected augmented reality system where the sensor includes a pose-detecting smart sensor, and where the memory includes instructions that when executed by the processor cause the computer to: obtain three-dimensional pose data by receiving the three-dimensional pose data from the pose-detecting smart sensor. The projected augmented reality system where the memory includes instructions that when executed by the processor cause the computer to: filter three-dimensional pose data for the operator from the three-dimensional pose data obtained using the sensor.

Various other components and processes may be included and called upon for providing for aspects of the teachings herein. For example, additional materials, processes, combinations of materials, combinations of processes, and/or omission of materials or processes may be used to provide for added embodiments that are within the scope of the teachings herein.

Standards for performance, selection of materials, functionality, and other discretionary aspects are to be determined by a user, designer, manufacturer, or other similarly interested party. Any standards expressed herein are merely illustrative and are not limiting of the teachings herein.

When introducing elements of the present invention or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

While the invention has been described with reference to illustrative embodiments, it will be understood by those skilled in the art that various changes may be made and equivalents may be substituted for elements thereof without departing from the scope of the invention. Although the title of the invention is "PROJECTED AUGMENTED REALITY INTERFACE WITH POSE TRACKING FOR DIRECTING MANUAL PROCESSES," this title is not intended to be limiting, and instead refers to particular examples described herein. Similarly, the field of the invention and description of related art are not intended to be limiting. In addition, many modifications will be appreciated by those skilled in the art to adapt a particular instrument, situation, process, or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A projected augmented reality system for directing an operator to perform a manual process, comprising:
a video projector, configured to project a dynamically-changing image onto a surface within a work area of the operator;
a two-dimensional camera with a wide field of view configured to capture two-dimensional images of a large area including the operator and of the work area;
a two-dimensional camera with a narrow field of view configured to capture more-detailed two-dimensional images of a part within the large area;
a depth sensor configured to capture three-dimensional images of the operator and of the work area; and
a computer communicatively connected to the video projector, the two-dimensional camera with a wide field of view, the two-dimensional camera with a narrow field of view, and the depth sensor, the computer comprising a memory and a processor, the memory including instructions that when executed by the processor cause the computer to:
receive a two-dimensional image of the operator and of at least a portion of the work area from the two-dimensional camera with a wide field of view;
determine pose data for the operator from the two-dimensional image;
receive a three-dimensional image of the operator and of the work area from the depth sensor;
update the pose data with depth coordinates based on the three-dimensional image to provide three-dimensional pose data;
receive a more detailed two-dimensional image of a part within the large area from the two-dimensional camera with a narrow field of view;
determine a part and part placement data for the operator from the two-dimensional image;
determine an output graphical image based on the sequence of three-dimensional pose data over time, the part and part placement data, and on the current production state; and
send the output graphical image to the video projector for projection onto the work area.

2. The projected augmented reality system of claim 1, wherein the image sensor and the depth sensor are contained within a single housing.

3. The projected augmented reality system of claim 2, wherein the single housing further contains the video projector.

4. The projected augmented reality system of claim 3, wherein the single housing further contains the computer.

5. The projected augmented reality system of claim 1, wherein the memory includes instructions that when executed by the processor cause the computer to determine pose data for the operator from the two-dimensional image by:
determining pose data for all humans visible in the two-dimensional image; and
filtering pose data for the operator from pose data of other humans visible in the two-dimensional image.

6. The projected augmented reality system of claim 5, wherein the memory includes instructions that when executed by the processor cause the computer to filter pose data for the operator from pose data of other humans visible in the two-dimensional image based on a position or an area of at least a portion of the pose data.

7. The projected augmented reality system of claim 5, wherein the memory includes instructions that when executed by the processor cause the computer to filter pose data for the operator from pose data of other humans visible in the two-dimensional image based on a position within a predefined boundary box or an area within the predefined boundary box of at least a portion of the pose data.

8. The projected augmented reality system of claim 7, wherein the memory includes instructions that when executed by the processor cause the computer to filter pose data for the operator from pose data of other humans visible in the two-dimensional image based on a weighted average of a normalized measure of the position within the predefined boundary box and a normalized measure of the area within the predefined boundary box of at least a portion of the pose data.

9. The projected augmented reality system of claim 1, wherein the memory includes instructions that when executed by the processor further cause the computer to:
determine estimated three-dimensional locations of the operator's hands based on the three-dimensional pose data; and
wherein the memory includes instructions that when executed by the processor cause the computer to determine an output image based on a sequence of estimated three-dimensional locations of the operator's hands over time.

10. The projected augmented reality system of claim 1, wherein the memory includes instructions that when executed by the processor further cause the computer to filter the three-dimensional pose data.

11. The projected augmented reality system of claim 10, wherein the memory includes instructions that when executed by the processor cause the computer to filter the three-dimensional pose data using Kalman filtering.

12. The projected augmented reality system of claim 1, wherein the memory includes instructions that when executed by the processor further cause the computer to map the output graphical element into the output image for projection onto the surface using a three-dimensional model containing a representation of at least a portion of the work area and of the video projector.

13. The projected augmented reality system of claim 12, wherein the output graphical image being further based on part quality data.

14. The projected augmented reality system of claim 1, wherein the memory includes instructions that when executed by the processor further cause the computer to:
determine pose data for the operator that includes data for the operator's fingers from either the two-dimensional image or the three-dimensional image, or both the two-dimensional image and the three-dimensional image;
determine a gesture based on the pose data for the operator's fingers; and
determine a command based on the gesture.

15. The projected augmented reality system of claim 1 further comprising an eye tracking device communicatively connected to the computer.

16. The projected augmented reality system of claim 15, wherein the memory further includes instructions that when executed by the processor cause the computer to:
receive an eye tracking signal indicative of the operator's gaze from the eye tracking device; and
determine a command in a projected augmented reality user interface based on the operator's gaze over a period of time.

17. The projected augmented reality system of claim 15, wherein the memory further includes instructions that when executed by the processor cause the computer to:
receive an eye tracking signal indicative of the operator's gaze from the eye tracking device; and
use the eye tracking signal to determine whether the operator has properly inspected an assembly by scanning it with his eyes.

18. The projected augmented reality system of claim 15, wherein the memory further includes instructions that when executed by the processor cause the computer to:
receive an eye tracking signal indicative of the operator's gaze from the eye tracking device; and
use the eye tracking signal to estimate a degree of engagement of the operator by measuring how closely the operator looks at his work during operations, and how often he looks away from his work.

19. The projected augmented reality system of claim 1, further comprising a microphone communicatively connected to the computer, and wherein the memory further includes instructions that when executed by the processor cause the computer to:
receive a voice signal of the operator from the microphone; and
interact with the operator based on the voice signal.

20. The projected augmented reality system of claim 1, further comprising a barcode scanner communicatively connected to the computer, and wherein the memory further includes instructions that when executed by the processor cause the computer to:
receive a command based on a barcode scanned with the barcode scanner.

21. The projected augmented reality system of claim 1, wherein the computer is connected to a network.

22. The projected augmented reality system of claim 21, wherein all data from the projected augmented reality system is stored on a server connected to the network.

23. The projected augmented reality system of claim 21, wherein a supervisory computer connected to the network is configured to remotely monitor the projected augmented reality system.

24. The projected augmented reality system of claim 21, wherein a factory manufacturing execution system provides production information over the network for use by the projected augmented reality system.

25. The projected augmented reality system of claim 21, wherein a handheld device connected to the network is used to configure the projected augmented reality system.

26. The projected augmented reality system of claim 1, wherein at least the image sensor and the depth sensor are mounted on a motorized mount that is communicatively connected to the computer, and wherein the memory further includes instructions that when executed by the processor cause the computer to move the motorized mount to track a position of the operator within the work area.

27. The projected augmented reality system of claim 1, wherein at least the image sensor and the depth sensor are mounted on a motorized mount that is communicatively connected to the computer, and wherein the memory further includes instructions that when executed by the processor cause the computer to move the motorized mount to track a position of a work piece.

28. The projected augmented reality system of claim 1, wherein the memory further includes instructions that when executed by the processor cause the computer to identify the operator based on facial recognition.

29. The projected augmented reality system of claim 28, wherein the memory further includes instructions that when executed by the processor cause the computer to use either the two-dimensional image or the three-dimensional image, or both the two-dimensional image and the three-dimensional image for facial recognition.

30. A method for using a projected augmented reality system for directing an operator to perform a manual process, comprising:
receiving by a computer a wide field of view two-dimensional image of the operator and of at least a portion of a work area from an image sensor;
determining by the computer pose data for the operator from the wide field of view two-dimensional image;
receiving by the computer a three-dimensional image of the operator and of the work area from a depth sensor;
updating by the computer the pose data with depth coordinates based on the three-dimensional image to provide three-dimensional pose data;
receiving a more detailed narrow field of view two-dimensional image of a part within the wide field of view two-dimensional image;
determining a part and part placement data for the operator from the narrow field of view two-dimensional image;
determining an output graphical image based on the three-dimensional pose data over time, the part and part placement data, and on a current production state; and
sending the output graphical image onto a surface within the work area using a video projector.

31. The method of claim 30, wherein determining by the computer pose data for the operator from the two-dimensional image comprises:
determining pose data for all humans visible in the two-dimensional image; and
filtering pose data for the operator from pose data of other humans visible in the two-dimensional image.

32. The method of claim 30, further comprising mapping by the computer the output graphical element into the output image for projection onto the surface using a three-dimensional model containing a representation of at least a portion of the work area and of the video projector.

33. The method of claim 30, wherein the output graphical image being further based on part quality data.

34. The method of claim 30, further comprising:
determining, by the computer, pose data for the operator that includes data for the operator's fingers from either the two-dimensional image or the three-dimensional image, or both the two-dimensional image and the three-dimensional image;
determining, by the computer, a gesture based on the pose data for the operator's fingers;
determining, by the computer, a command based on the gesture; and
executing the command.

35. A projected augmented reality system for directing an operator to perform a manual process, comprising:
a video projector, configured to project a dynamically-changing image onto a surface within a work area of the operator;
a depth sensor;
a two-dimensional camera with a narrow field of view; and
a computer communicatively connected to the video projector and the depth sensor, the computer comprising a memory and a processor, the memory including instructions that when executed by the processor cause the computer to:
obtain three-dimensional pose data using the depth sensor;
obtain part, part placement and part quality data using the two-dimensional camera with a narrow field of view;
determine an output graphical image based on the part, part placement and part quality data, and on a current production state; and
sending an output image based on the output graphical image onto a surface within the work area using a video projector.

36. The projected augmented reality system of claim 35 further comprising a two-dimensional camera with a wide field of view configured to capture two-dimensional images of a large area including the operator and of the work area wherein the memory includes instructions that when executed by the processor cause the computer to:
receive a two-dimensional image of the operator and of at least a portion of the work area from the two-dimensional camera with a wide field of view.

37. The projected augmented reality system of claim 36 wherein the memory includes instructions that when executed by the processor cause the computer to:
receive three-dimensional image data from the depth sensor and obtain three-dimensional pose data by determining three-dimensional pose data based, at least in part, on the three-dimensional image data.

38. The projected augmented reality system of claim 37, wherein the memory includes instructions that when executed by the processor cause the computer to:
determine an output graphical image based on the sequence of three-dimensional pose data over time and on the current production state.

39. The projected augmented reality system of claim 38, wherein the memory includes instructions that when executed by the processor cause the computer to:
send the output graphical image to the video projector for projection onto the work area.

40. The projected augmented reality system of claim 1 wherein the part and part placement data are selected from the group consisting of correct part data, correct parts container data, correct assembly tools data, and correct assembly data.

* * * * *